United States Patent
Kay et al.

(10) Patent No.: US 10,530,467 B2
(45) Date of Patent: *Jan. 7, 2020

(54) APPROACHES FOR IMPROVED FREQUENCY REUSE EFFICIENCY AND INTERFERENCE AVOIDANCE FOR A MULTI-BEAM SATELLITE COMMUNICATIONS NETWORK

(71) Applicant: Hughes Network Systems, LLC, Germantown, MD (US)

(72) Inventors: Stanley Kay, Rockville, MD (US); Dave Roos, Boyds, MD (US); Paul Gaske, Rockville, MD (US); Anthony Noerpel, Lovettsville, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,716

(22) Filed: Jul. 16, 2019

(65) Prior Publication Data

US 2019/0341997 A1 Nov. 7, 2019

Related U.S. Application Data

(63) Continuation of application No. 15/906,632, filed on Feb. 27, 2018, now Pat. No. 10,355,775.

(Continued)

(51) Int. Cl.
*H04B 7/185* (2006.01)
*H04B 7/06* (2006.01)
(Continued)

(52) U.S. Cl.
CPC ......... *H04B 7/18513* (2013.01); *H04B 7/068* (2013.01); *H04B 7/0617* (2013.01);
(Continued)

(58) Field of Classification Search
CPC ........ H04B 7/0617; H04B 7/068; H04B 7/10; H04B 7/12; H04B 7/185; H04B 7/18513;
(Continued)

(56) References Cited

U.S. PATENT DOCUMENTS

| 4,823,341 A | 4/1989 | Rosen |
| 5,473,601 A | 12/1995 | Rosen et al. |

(Continued)

FOREIGN PATENT DOCUMENTS

WO    WO1988001456 A1    2/1988

OTHER PUBLICATIONS

USPTO, "International Search Report & Written Opinion", PCT/US2017/021008, dated Nov. 16, 2017.

(Continued)

*Primary Examiner* — Dominic E Rego
(74) *Attorney, Agent, or Firm* — Potomac Technology Law, LLC

(57) ABSTRACT

An RF communications transmitter system comprising a processor, a switch and a plurality of feedhorns. The switch is configured to receive a feed signal of a frequency bandwidth. The processor is configured to control the switch to provide the feed signal to each of at least two of the feedhorns for a respective time period. Each of the at least two feedhorns is configured to generate a beam during the respective time period that the feed signal is provided thereto, wherein the beam is formed based on the feed signal and is transmitted to cover a geographic area of the Earth. The formation and transmission of the beams by the feedhorns is controlled by the processor to provide a time-based allocation of bandwidth amongst the beams based on the time period that the feed signal is provided to each of the feedhorns and a respective frequency/polarization reuse scheme.

12 Claims, 18 Drawing Sheets

Related U.S. Application Data

(60) Provisional application No. 62/441,300, filed on Dec. 31, 2016.

(51) Int. Cl.
*H04B 7/10* (2017.01)
*H04B 7/12* (2006.01)
*H04B 7/204* (2006.01)
*H04W 40/20* (2009.01)

(52) U.S. Cl.
CPC ............. *H04B 7/10* (2013.01); *H04B 7/12* (2013.01); *H04B 7/185* (2013.01); *H04B 7/18515* (2013.01); *H04B 7/2041* (2013.01); *H04W 40/20* (2013.01)

(58) Field of Classification Search
CPC .. H04B 7/18515; H04B 7/2041; H04W 40/20
See application file for complete search history.

(56) References Cited

U.S. PATENT DOCUMENTS

| | | |
|---|---|---|
| 5,485,464 A | 1/1996 | Strodtbeck |
| 7,200,360 B1 | 4/2007 | Chang et al. |
| 7,382,743 B1 | 6/2008 | Rao et al. |
| 7,436,370 B2 | 10/2008 | Blanton |
| 7,773,942 B2 | 8/2010 | Hudson et al. |
| 2002/0090942 A1 | 7/2002 | Karabinis et al. |
| 2004/0192376 A1 | 9/2004 | Grybos |
| 2008/0055151 A1 | 3/2008 | Hudson et al. |
| 2008/0056176 A1 | 3/2008 | Hudson et al. |
| 2008/0233865 A1 | 9/2008 | Malarky et al. |
| 2011/0268017 A1 | 11/2011 | Miller |
| 2012/0147812 A1 | 6/2012 | Hudson et al. |
| 2014/0295752 A1 | 10/2014 | Dankberg |
| 2016/0254855 A1 | 9/2016 | Tong et al. |
| 2017/0070308 A1 | 3/2017 | Hahn et al. |
| 2018/0014261 A1 | 1/2018 | Miranda et al. |

OTHER PUBLICATIONS

USPTO, "International Search Report and Written Opinion", PCT/US2018/019979, dated May 15, 2018.

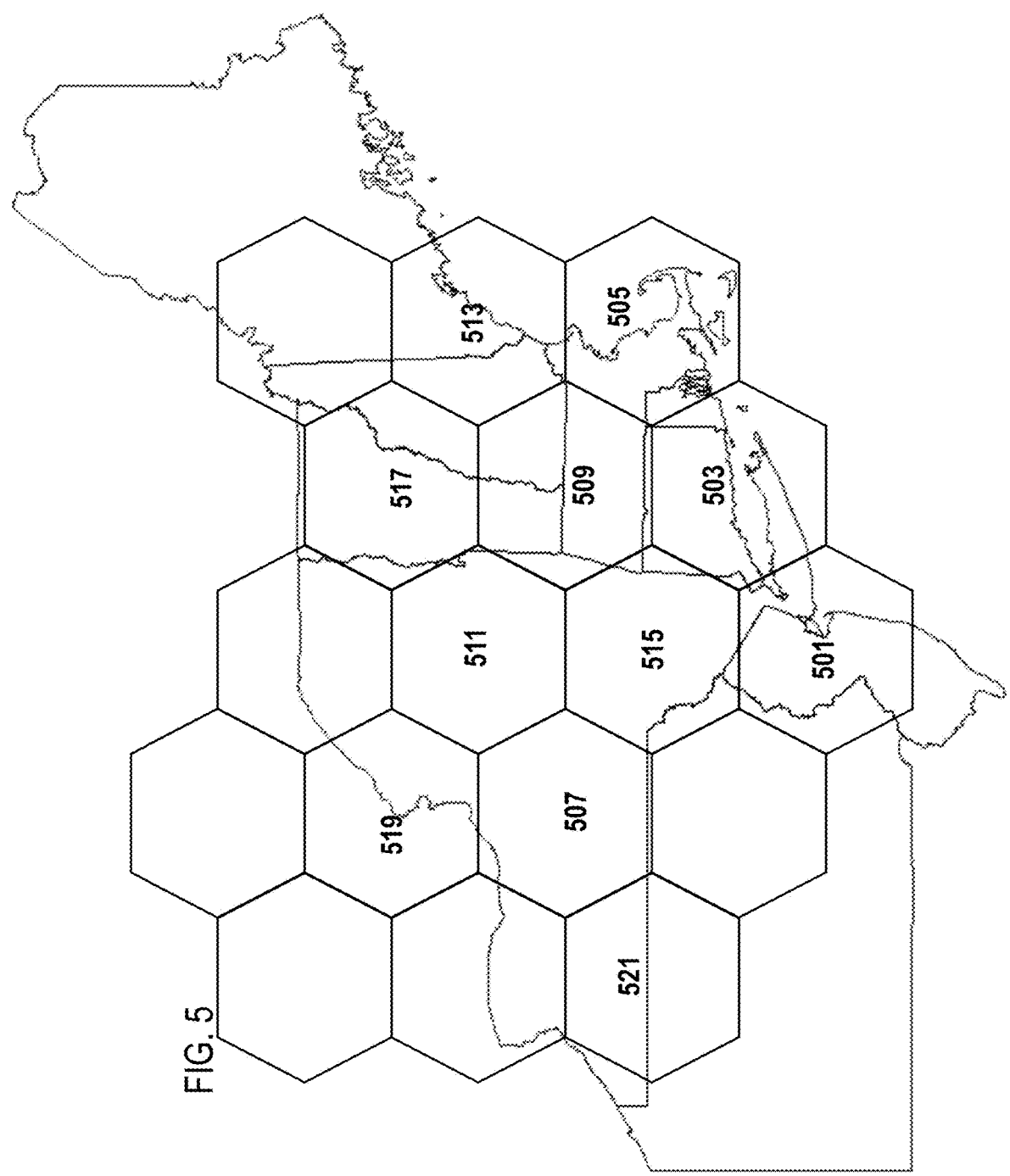

APPROACHES FOR IMPROVED FREQUENCY REUSE EFFICIENCY AND INTERFERENCE AVOIDANCE FOR A MULTI-BEAM SATELLITE COMMUNICATIONS NETWORK

RELATED APPLICATIONS

This application is a continuation, and claims the benefit of the filing date under 35 U.S.C. § 120, from U.S. patent application Ser. No. 15/906,632 (filed 2018 Feb. 27) (now USPN 10,355,775), which claims the earlier filing date under 35 U.S.C. § 119(e) from U.S. provisional patent application Ser. No. 62/441,300 (filed 2016 Dec. 31), the entireties of which are incorporated herein by reference.

BACKGROUND

Multi-beam communications satellites (e.g., spot beam satellites) are designed such that a given geographic coverage area is serviced by a pattern of beams. With such multi-beam satellites, in order to avoid or minimize inter-beam interference, certain frequency reuse principles must be applied to the bream patterns of the antenna design. One of the primary guidelines for the beam pattern is that a frequency and polarization combination of one beam cannot be "reused" within a certain distance from another beam of the same frequency and polarization combination. The reuse distance between beams is generally specified as the distance between beam centers of two beams of a same color (two beams of the same frequency—the same frequency band and polarization), where the distance is quantified in terms of the center-to-vertex radius r of the circumscribing hexagon representing the beams. If the minimum distance requirements are not followed with regard to two such beams, then the beams will cause unacceptable levels of interference between them. The beam pattern design is commonly referred to as a frequency reuse pattern, where each polarization/frequency pair is diagrammatically reflected by a beam color (or pattern in the case of the black and white figures included herein). In typical systems, a reuse of four means that a set of four adjacent beams will have disjoint frequency and polarization assignments such that none of the beams of each set interfere with each other. In other words, adjacent sets of four beams separate the beams sharing a common frequency and polarization such that (even though they are reusing the same frequency and polarization assignments) the beams of one set will not interfere unacceptably with the respective beams of an adjacent set.

For example, FIG. 1A illustrates an example four-beam reuse pattern of a single satellite 110, where, for example, the striped pattern 101 reflects a right-hand polarization of a first frequency or frequency band, the dot pattern 103 reflects a left-hand polarization of the same frequency band as that of 101, the checkered pattern 105 reflects a right-hand polarization of a second frequency or frequency band, and the brick pattern 107 reflects a left-hand polarization of the same frequency band as that of 105. In such a four-color reuse pattern, the distance between the beams or beam centers of two beams of the same color are $2\sqrt{3}*r$ apart. As a further example, FIG. 1B illustrates an example three-beam reuse pattern, where (similar to the four-beam reuse pattern of FIG. 1A) each of the patterns 111, 113, 115 reflects a particular beam frequency/polarization assignment. In such a three-color reuse pattern, the distance between the beams or beam centers of two beams of the same color are $3*r$ apart. Accordingly, as illustrated by these Figures, each group of four or three particular polarization/frequency beams is geographically arranged such that a beam of a particular polarization/frequency is not adjacent to any beam of the same polarization/frequency (where such beam pairs of a same polarization/frequency are separated by a required minimum distance).

FIG. 1C illustrates example frequency band and polarization assignments for the beams of the four-beam reuse pattern of FIG. 1A. Each Beam A, for example, comprises signal A in the frequency band 18.3-18.8 GHz (500 MHz of spectrum for each such beam), applied to an RHCP feed of the downlink antenna. Each Beam B comprises signal B in the frequency band 19.7-20.2 GHz (500 MHz of spectrum for each such beam) applied to an RHCP feed of the downlink antenna. Each beam C comprises signal C in the frequency band 18.3-18.8 GHz (500 MHz of spectrum for each such beam) applied to an LHCP feed of the downlink antenna, and each beam D comprises signal D in the frequency band 19.7-20.2 GHz (500 MHz of spectrum for each such beam) applied to an LHCP feed of the downlink antenna.

FIG. 1D illustrates a block diagram of a configuration for two transmitters configured to transmit one set of the A, B, C, D (or 1, 2, 3, 4) signals to the satellite downlink antenna beams of the four-color reuse pattern of FIG. 1A. With reference to FIG. 1A, each of the beams of the four-color reuse pattern corresponds to a respective one of the RF signals A, B, C, D (as transmitted by a respective transmitter of FIG. 1D). Each of these four RF signals is transmitted by a feed on the downlink satellite antenna to form Beams A, B, C, D. Each of the transmitters comprises an amplifier 131, 151 (e.g., a traveling wave tube amplifier (TWTA)) and a filter 133, 153, and a circular polarizing feed 135, 155. For example, the A+B RF signals (e.g., 1000 MHz) are amplified via the TWTA 131 and the C+D RF signals (e.g., 1000 MHz) are amplified by the TWTA 151. The amplified A+B and C+D signals are then fed into the filters 133, 153, respectively, which separate the combined A+B and C+D into separate A, B, C, D RF signals. Each filter output is connected to a circular polarizing feed 135, 155, whereby the amplified A, B, C, D signals form two circularly polarized beams (e.g., of 500 MHz each). For example, with reference to FIG. 1D, a right-hand polarized Beam A (e.g., 500 MHz) and a right-hand polarized Beam B (e.g., 500 MHz) via the filter/polarizer 133/135, and a left-hand polarized Beam C (e.g., 500 MHz) and a left-hand polarized Beam D (e.g., 500 MHz) via the filter/polarizer 153/155.

FIG. 1E illustrates example frequency band and polarization assignments for the satellite downlink antenna beams of the three-beam reuse pattern of FIG. 1B. Each Beam A comprises the RHCP signal for the frequency band 18.2-19.2 GHz (1000 MHz of spectrum), each Beam B comprises the RHCP signal for the frequency band 18.2-19.2 GHz (1000 MHz of spectrum), and each Beam C comprises the LHCP and RHCP signals for the band 20.0-20.5 GHz (500 MHz of spectrum at the each of the two polarizations RHCP and LHCP totaling 1000 MHz of spectrum). Note that, for this configuration, the ground terminals configured to receive the beam C would be required to have good cross-polarization discrimination.

FIG. 1F illustrates a block diagram of a configuration for two transmitters configured to transmit one set of the A, B, C (or 1, 2, 3) signals to the satellite downlink antenna beams of the three-color reuse pattern of FIG. 1B. With reference to FIG. 1B, each of the beams of the three-color reuse pattern corresponds to a respective one of the RF signals A, B, C (as transmitted by a respective transmitter of FIG. 1F). Each of these three RF signals is transmitted by a feed on the downlink satellite antenna to form Beams A, B, C. Each of the transmitters comprises an amplifier 171, 191 (e.g., a traveling wave tube amplifier (TWTA)), a filter 173, 193, and a circular polarizing feed 175, 195. For example, the Feed 1 RF signal (e.g., 1500 MHz) is amplified via the TWTA 171 and the Feed 2 RF signal (e.g., 1500 MHz) is amplified by the TWTA 191. The amplified signals are then each fed into the filters 173, 193, respectively, which separate the signals into the respective A, B, C beam RF signals. Each filter output is connected to a circular polarizing feed 175, 195, whereby the amplified signals form the respective circularly polarized beams. For example, with reference to FIG. 1F, a right-hand polarized A beam (e.g., 1000 MHz) and a right-hand polarized partial C beam (e.g., 500 MHz) via the filter/polarizer 173/175, and a left-hand polarized B beam (e.g., 1000 MHz) and a left-hand polarized partial C beam (e.g., 500 MHz) via the filter/polarizer 193/195. The spectrum of the two partial C beams combine to provide a total C beam spectrum of 1000 MHz.

Satellite systems are generally designed to maximize capacity by using all of the available spectrum. For example, if 1000 MHz of spectrum (in both polarizations-right-hand polarization (RHCP) and left-hand polarization (LHCP)) is available for a particular system, the system theoretically has 2000 MHz of available spectrum for each beam group. With reference to the four-pattern reuse system of FIG. 1A, for example, each beam represented by the pattern 101 may comprise a RHCP of the frequency band 18.3-18.8 GHz, each beam represented by the pattern 103 may comprise a LHCP of the frequency band 18.3-18.8 GHz, each beam represented by the pattern 105 may comprise a RHCP of the frequency band 19.7-20.2 GHz, and each beam represented by the pattern 107 may comprise a LHCP of the frequency band 19.7-20.2 GHz. Each beam would thereby comprise 500 MHz of spectrum or bandwidth, for a total available capacity of 2,000 MHz within each four-beam group. The reuse pattern can be repeated as many times as desired, up to a maximum desired coverage region, as limited by applicable physical constraints, such as total power and mass limits of the overall satellite payload. The total system bandwidth is then the sum of the individual bandwidths of all the beams.

The Ka frequency band downlink comprises 1500 MHz on each polarization in the United States (U.S.) and as much as 2000 MHz in other regions. In the U.S., the Ka band is the band from 18.3-19.3 GHz and 19.7-20.2 GHz. In other regions, the Ka band may also include the band from 17.8-18.3 GHz. In a satellite system that primarily serves the continental United States (CONUS), the band may be provided as a 3 color reuse plan by frequency division. Specifically, each 1500 MHz may be divided into 6 colors, amounting to 12 colors when factoring in both polarizations. The 12 bands may then be grouped into three sets of four bands each, where the three sets are then routed through three distinct antennas on the satellite. The three-color reuse may also be accomplished by providing all 3000 MHz via a single beam and time hopping the beam over 3 cells, so each cell receives 1000 MHz on average. This approach, however, suffers from the disadvantage of requiring that every feed on each satellite antenna be dual-pol (operate in both polarizations).

The size of a spot beam is determined primarily by the size of the antenna on the satellite—the larger the antenna, the smaller the spot beam. Further, as would be recognized by one of ordinary skill in the art, in order to achieve reasonably acceptable RF performance, the number of beams and the reuse pattern employed will impose certain payload design requirements, such as the number of antennae and the size of each antenna required to implement the desired beam pattern. To cover the eastern half of the continental United States (CONUS), for example, one might design a satellite payload with 50 beams, each of approximately 0.5 degrees diameter, using a three-color reuse pattern. The antennas of such a payload might each be approximately 2.5 m in diameter and three or even four such antennae (e.g., 110*a*, 110*b*, 110*c*, 110*d*) may be required to achieve desired RF performance. Each beam may be assigned 666 MHz, yielding a total of 33.3 GHz of bandwidth. Accordingly, the desired number of beams, reuse pattern and total capacity will contribute to payload size, weight and power requirements, which in turn will drive up the satellite manufacturing and launch costs.

Moreover, in practice, the distribution of users and associated capacity demand within the coverage area is non-uniform, which drives the goal of a satellite system design to provide a corresponding non-uniform distribution of capacity density to satisfy the respective demand. Accordingly, in recent times, some satellite system designs have attempted to solve capacity density requirements by deploying such satellite technologies as steerable beams. FIG. 1G illustrates the four pattern reuse plan of FIG. 1A, where the beams 1, 2, 3, 4 represent the patterns 101, 103, 105, 107, respectively, and the beam pattern has been overlaid on a map of the Northeastern United States. As further illustrated in FIG. 1G, in order to provide higher capacity density to the New York/Long Island, Southern Connecticut and Boston areas, certain of the beams have been steered to double the capacity over these regions (e.g., the 3 beam 121 has been moved to the cell 122, the 1 beam 123 has been moved to the cell 124, the 3 beam 125 has been moved to the cell 126, and the 2 beam 127 has been moved to the cell 128). Accordingly, the capacity density has been adjusted to double the spectrum/capacity delivered to the cells 122, 124, 126, 128. This capacity density adjustment, however, has been achieved at the expense of the capacity delivered to the cells 121, 123, 125, 127—as spectrum cannot be provided to these cells without violating the adjacent cell polarization/frequency requirements.

An alternative design may provide for a higher per-beam spectrum allocation. In view of such constraints as satellite size, weight and power, however, such a design would limit the total number of beams available at the higher spectrum allocation. Further, providing for such high capacity beams also significantly increases satellite complexity. Accordingly, with this design, there may not be enough user beams to cover the contiguous United States, and thus the capacity would have to be provided to the higher density population areas at the expense of having no capacity provided to the lower density population areas (e.g., providing user beams over only the Eastern and Western coasts of the United States. Accordingly, again, the desired capacity density allocation is achieved at the expense of being unable to provide capacity to certain geographic regions.

What is needed, therefore, are approaches for flexible capacity allocation in satellite communications systems, without sacrificing capacity in adjacent beams and without adverse impact with regard to satellite size, weight, power and complexity constraints.

SOME EXAMPLE EMBODIMENTS

The present invention advantageously addresses the foregoing requirements and needs, as well as others, by providing approaches for time-based frequency reuse schemes in satellite communications systems that facilitate flexible capacity allocation, whereby capacity density is dynamically adaptable in time across the different ground-based cells of the system coverage area, without sacrificing capacity in adjacent beams and without adverse impact with regard to satellite size, weight, power and complexity constraints. By way of example, such approaches avoid the partitioning of the frequencies of a particular polarization, thus eliminating filter requirements and reducing the satellite antenna hardware complexity. By way of further example, dual polarization per antenna feed requirements are avoided in a frequency reuse scheme, whereby the total available frequency spectrum is provided to the cells using only a single filter per polarization, and time-based beams are applied accordingly. For example, in a three-color reuse scheme, 3000 MHz of spectrum is provided to the 3 cells using only a single 1500 MHz filter per polarization, where each cell receives 1000 MHz on average. Alternatively, as a further example, this approach would also be applicable to a case where 2000 MHz was available, or even a case where the same time-based beam crossed political boundaries such that 1500 MHz used part of the time and 2000 MHz was used at other times.

In accordance with example embodiments, a radio frequency (RF) communications transmitter system is provided. The RF communications transmitter system comprises at least one control processor, a switch and a plurality of feedhorns. The switch is configured to receive a feed signal of a respective frequency bandwidth. The processor is configured to control the switch to provide the feed signal received by the switch to each of at least two of the plurality of feedhorns for a respective time period. Each of the at least two of the plurality of feedhorns is configured to form and transmit a beam during the respective time period that the feed signal is provided to the feed horn, wherein the beam is formed based on the respective feed signal and is transmitted to cover a respective geographic area on and above the Earth. The formation and transmission of the beams by the feedhorns is controlled by the processor to provide a time-based allocation of bandwidth amongst the beams based on the respective time period that the feed signal is provided to each of the at least two of the plurality of feedhorns and a respective frequency/polarization reuse scheme.

In accordance with further example embodiments, a radio frequency (RF) communications transmission method is provided. A switch of an RF communications transmitter system receives a feed signal of a respective frequency bandwidth. A processor controls the switch to provide the feed signal received by the switch to each of at least two of a plurality of feedhorns of the RF communications transmitter system for a respective time period. Each of the at least two of the plurality of feedhorns forms and transmits a beam during the respective time period that the feed signal is provided to the feedhorn, where the beam is formed based on the respective feed signal and is transmitted to cover a respective geographic area on and above the Earth. The formation and transmission of the beams by the feedhorns is controlled by the processor to provide a time-based allocation of bandwidth amongst the beams based on the respective time period that the feed signal is provided to each of the at least two of the plurality of feedhorns and a respective frequency/polarization reuse scheme.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which:

FIG. 3A depicts the pattern during a first Dwell Time (T1), FIG. 3B depicts the pattern during a second Dwell Time (T2) and FIG. 3C depicts the pattern during a third Dwell Time (T3), in accordance with example embodiments of the present invention;

FIG. 5 illustrates the beam/cell pattern of the time-based frequency reuse scheme depicted in FIGS. 3A-3D overlaid on a map of the Northeastern United States, in accordance with example embodiments of the present invention;

FIG. 9A depicts the pattern during a first Dwell Time (T1), FIG. 9B depicts the pattern during a second Dwell Time (T2) and FIG. 9C depicts the pattern during a third Dwell Time (T3), in accordance with example embodiments of the present invention;

DETAILED DESCRIPTION

Figure 1A:
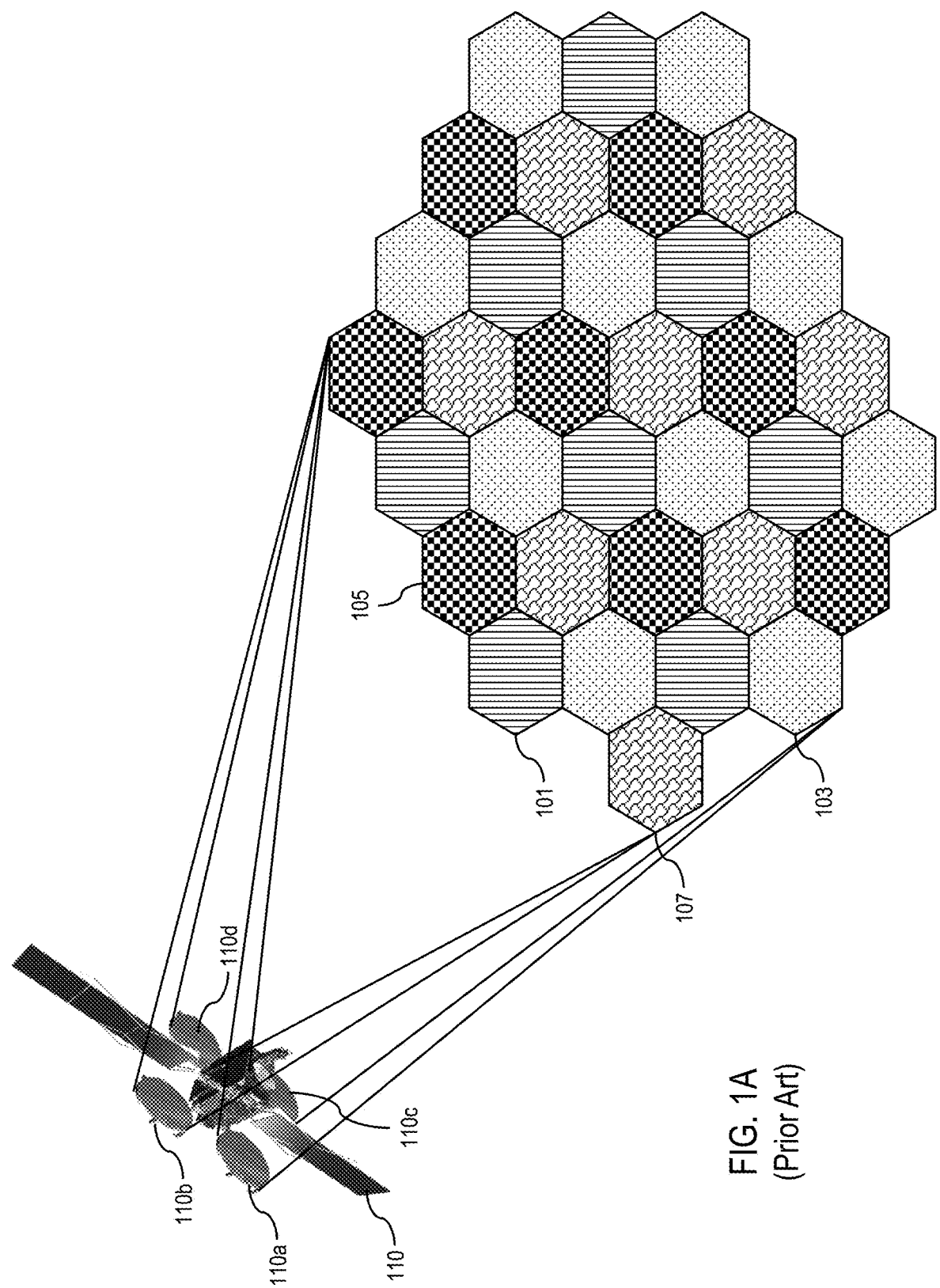
FIG. 1A illustrates an example four-beam reuse pattern for a satellite communications system.
Figure 1B:
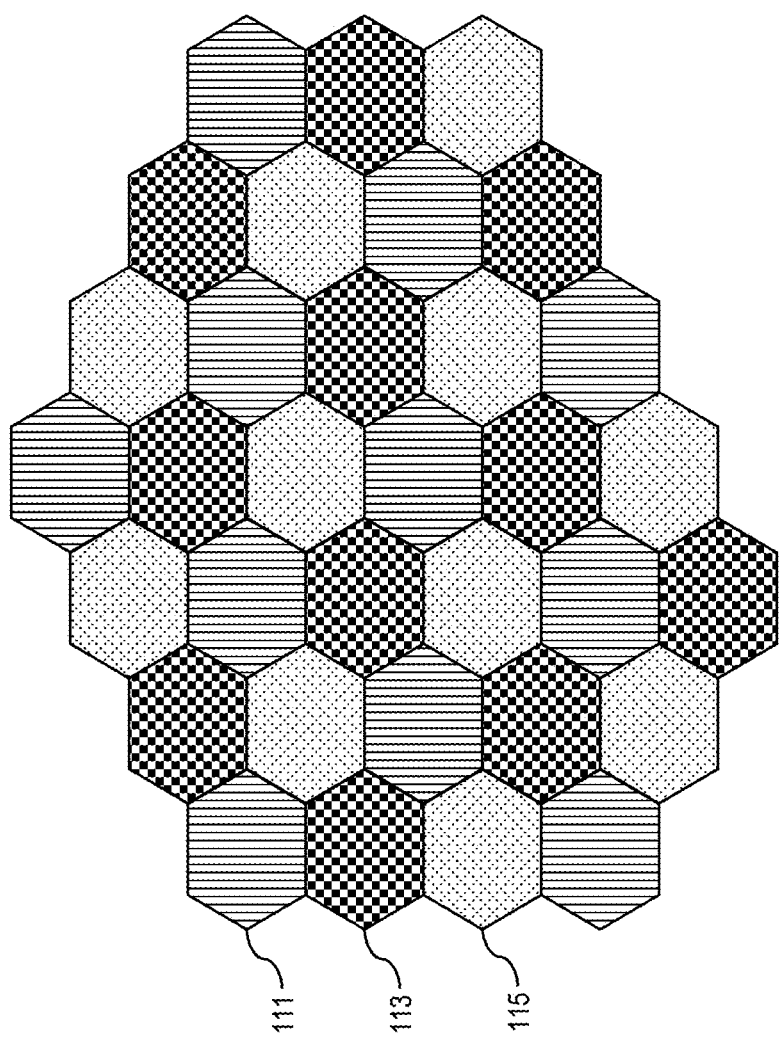
FIG. 1B illustrates an example three-beam reuse pattern for a satellite communications system.
Figure 1C:
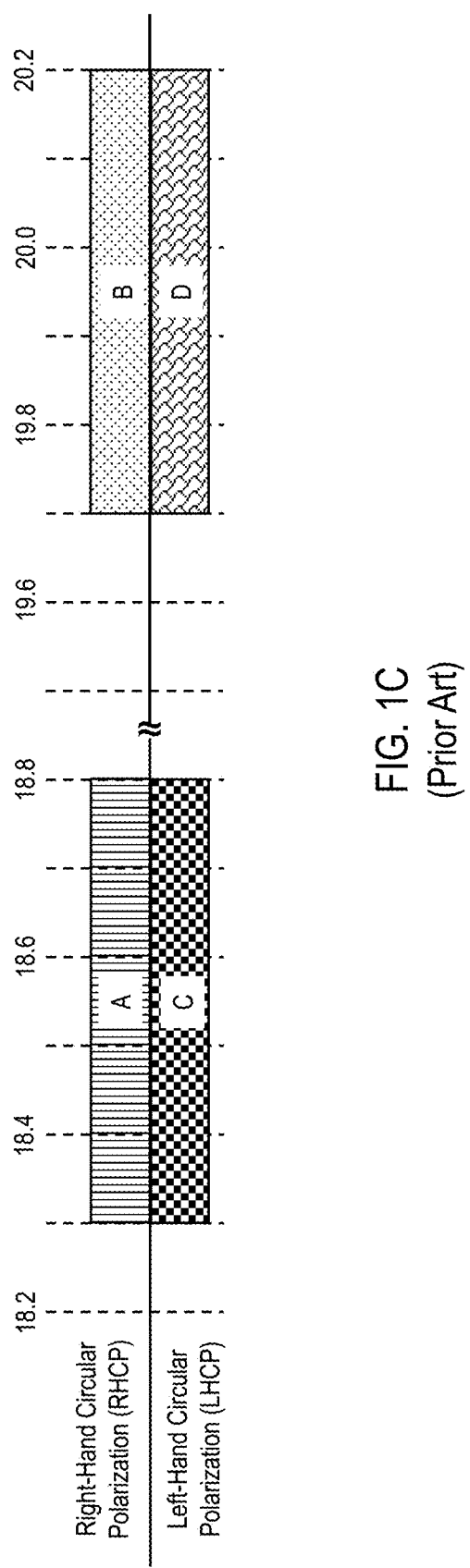
FIG. 1C illustrates example frequency band and polarization assignments for the beams of the four-beam reuse pattern of FIG. 1A.
Figure 1D:
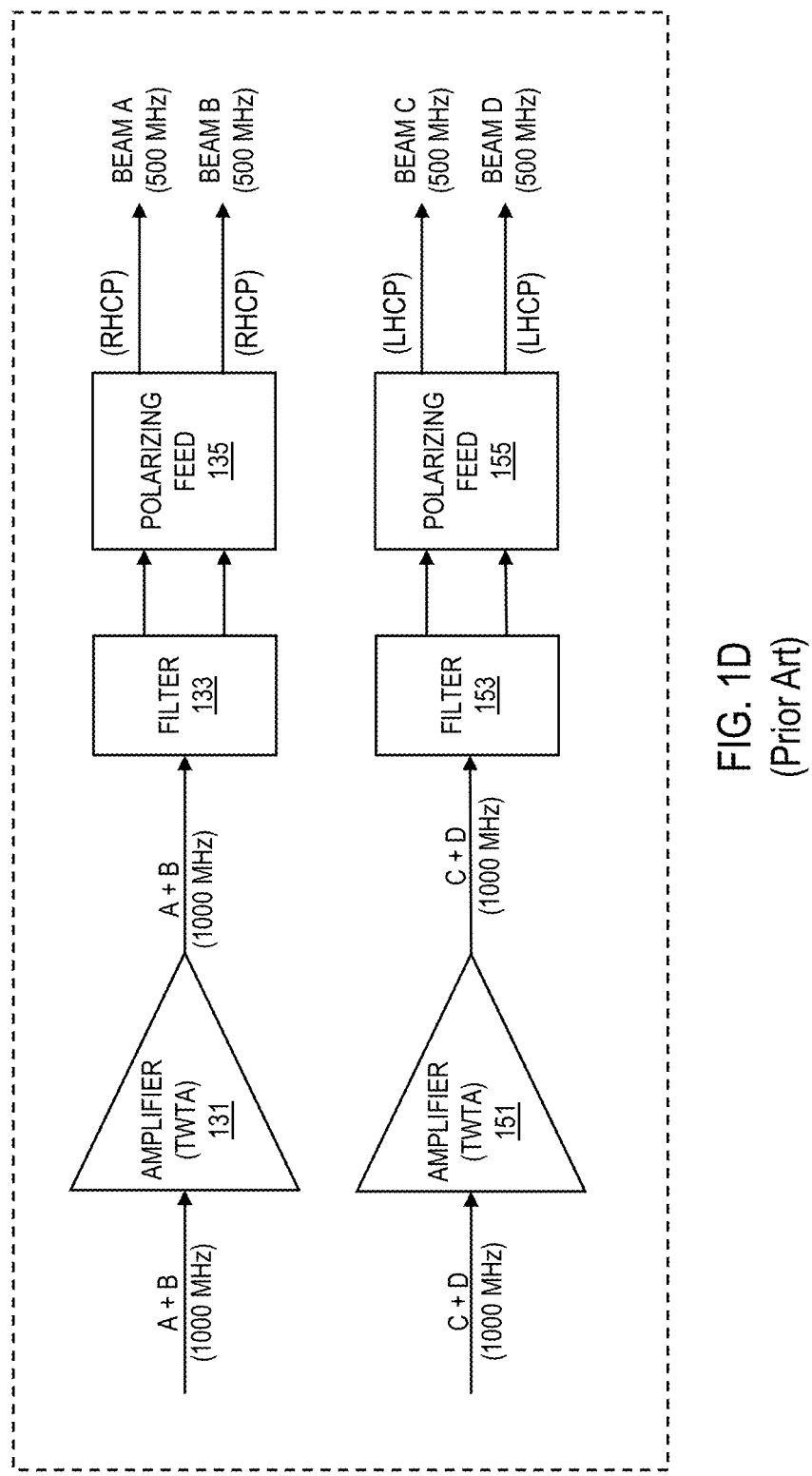
FIG. 1D illustrates a block diagram of a configuration for two transmitters configured to transmit one set of the A, B, C, D (or 1, 2, 3, 4) signals to the satellite downlink antenna beams of the four-color reuse pattern of FIG. 1A.
Figure 1E:
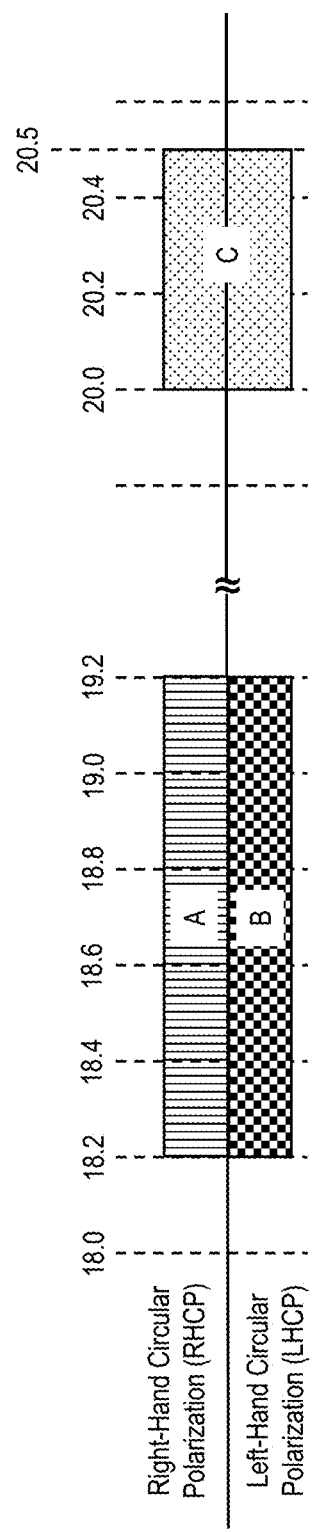
FIG. 1E illustrates example frequency band and polarization assignments for the satellite downlink antenna beams of the three-beam reuse pattern of FIG. 1B.
Figure 1F:
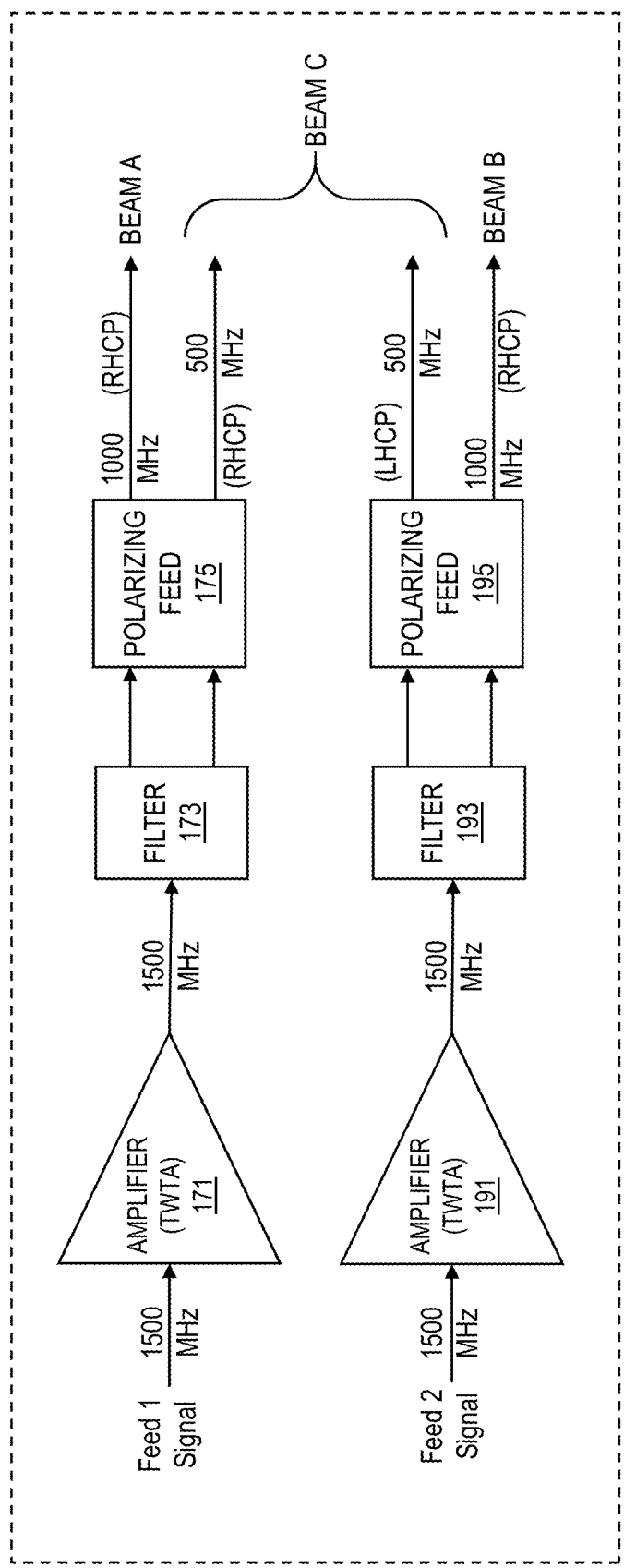
FIG. 1F illustrates a block diagram of a configuration for two transmitters configured to transmit one set of the A, B, C (or 1, 2, 3) signals to the satellite downlink antenna beams of the three-color reuse pattern of FIG. 1B.
Figure 1G:
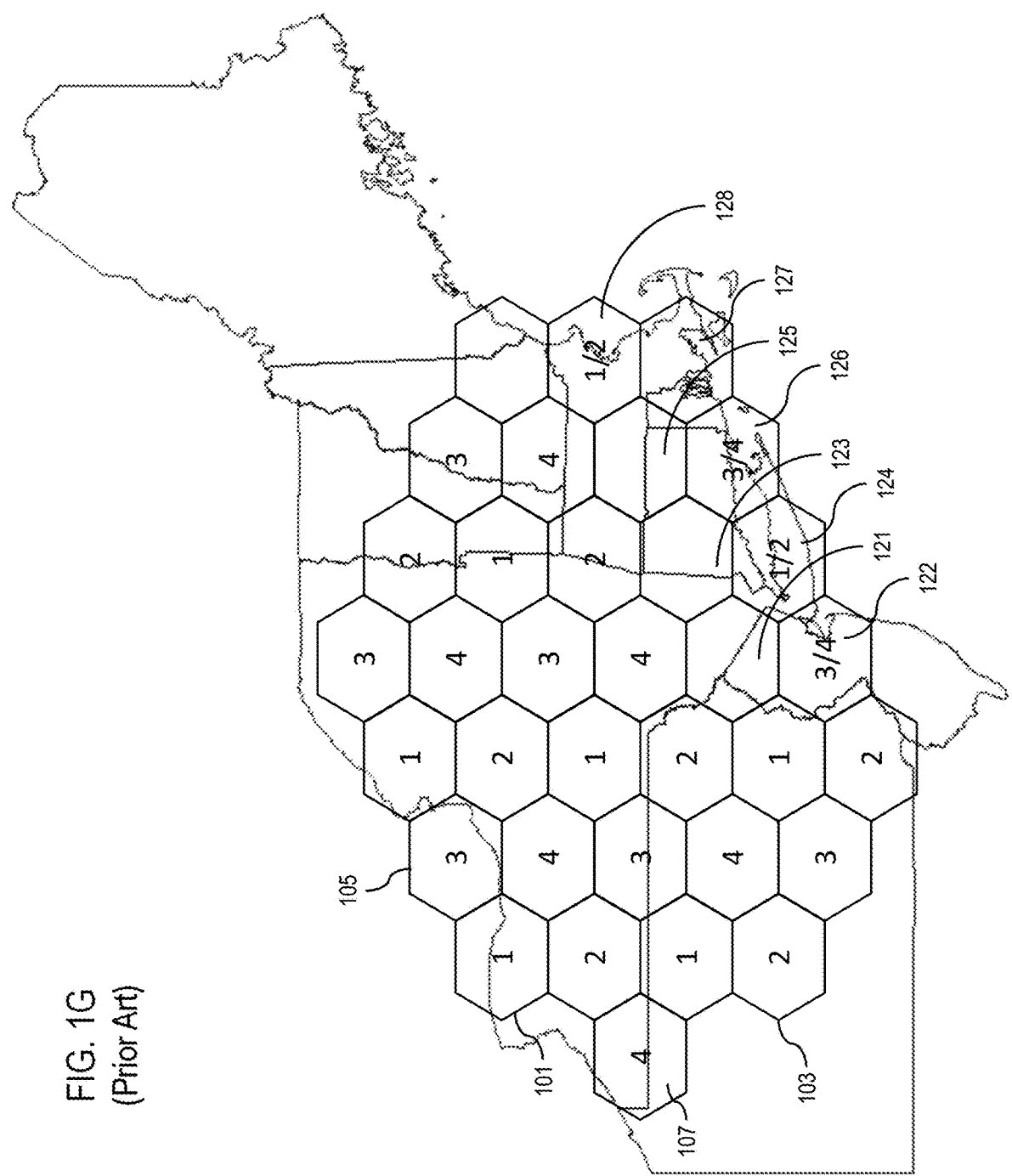
FIG. 1G illustrates the four pattern reuse plan of FIG. 1A, where the beam pattern has been overlaid on a map of the Northeastern United States.

Approaches for time-based frequency reuse schemes in satellite communications systems that facilitate flexible capacity allocation, whereby capacity density is dynamically adaptable in time across the different ground-based cells of the system coverage area, without sacrificing capacity in adjacent beams and without adverse impact with regard to satellite size, weight, power and complexity constraints, are provided. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical storage media, magnetic storage media or electrical storage media (e.g., solid state storage media). Volatile media include dynamic memory, such random access memory or RAM, and non-volatile memory include memory such as programmable read only memory (PROM), erasable PROM, flash EPROM, any other memory chip or cartridge, or any other such medium from which a processor can read data.

Further, while the following example embodiments comprise application of the concepts of the present invention to a satellite transmission system, the invention is not limited to only satellite applications. Instead, the concepts of the present invention are applicable to any wireless radio frequency (RF) communications platform that provides data communications services via one or more discrete radio frequency communications beams. By way of example, the concepts of the invention are applicable to high altitude platforms (HAPs) for wireless telecommunications. A HAP generally operates in a quasi-stationary position at altitudes of upwards of 22 kilometers (typically 17-22 km). Such a HAP will carry a communications payload somewhat akin to a satellite payload. HAPS, however, operate at much lower altitudes than satellites, making it possible to cover smaller regions more effectively, for example, via radio frequency communications beams. A HAP may also relay data communications via a satellite (e.g., a geostationary orbit satellite or a low earth orbit satellite).

Figure 2:
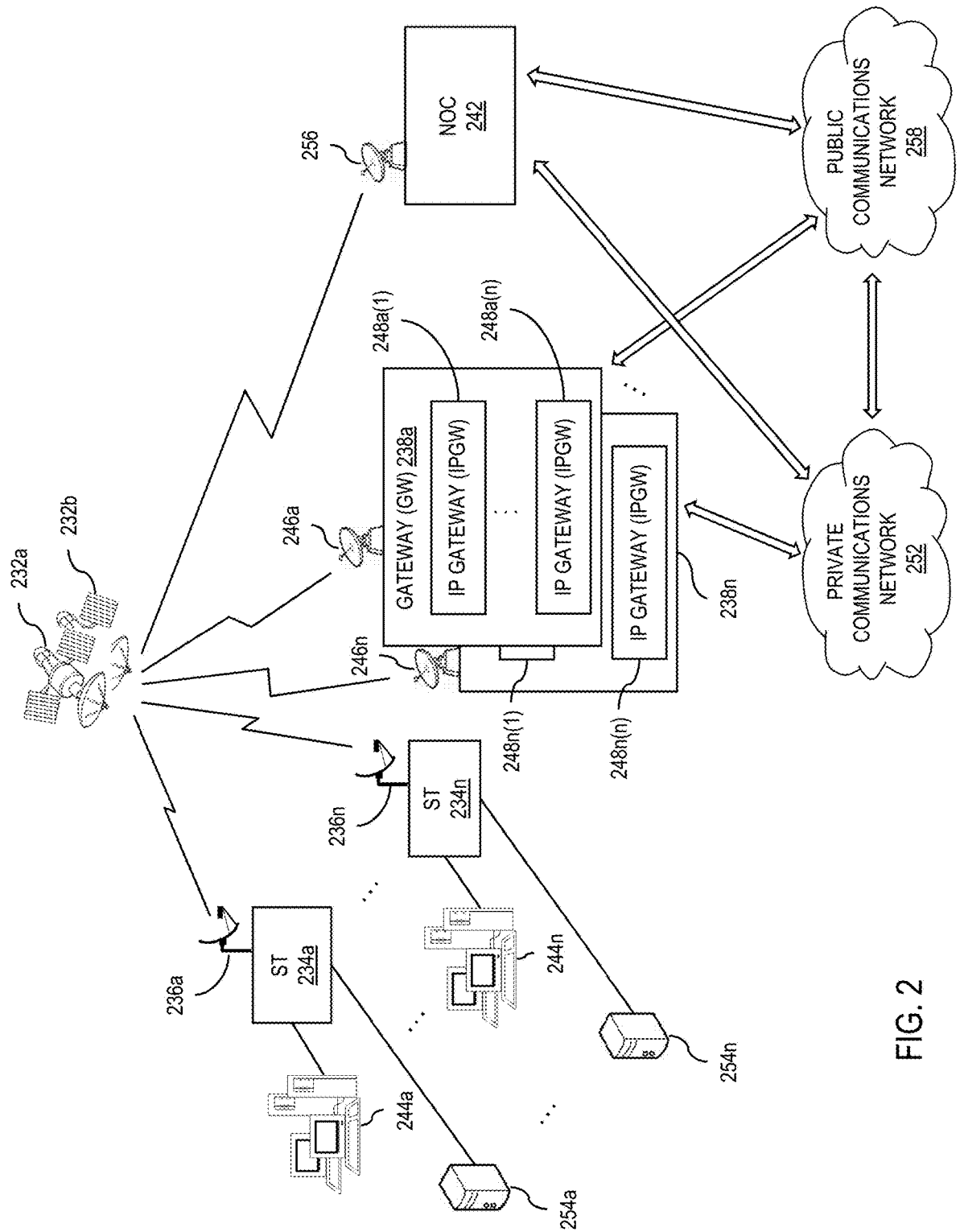
FIG. 2 illustrates an example satellite communications system capable of providing approaches for a satellite communications system that employs spot beams of increased capacity density, in accordance with example embodiments of the present invention.

FIG. 2 illustrates an example satellite communications system capable of providing approaches for a satellite communications system that employs spot beams of increased capacity density, in accordance with example embodiments of the present invention.

The satellite communications system includes one or more satellites (of which two are shown in the Figure—satellites 232*a* and 232*b*) that support communications among multiple satellite terminals (STs) 234*a*-234*n*, a number of gateways (GWs) 238*a*-238*n*, and a network operations center (NOC) 242. The STs, GWs and NOC transmit and receive signals via the antennas 236*a*-236*n*, 246*a*-246*n*, and 256, respectively. According to different embodiments, the NOC 242 may reside at a separate site reachable via a separate satellite channel or may reside within a GW site. The NOC 242 performs the management plane functions of the system 230, while the GWs 238*a*-238*n* perform the data plane functions of the system 230. For example, the NOC 242 performs such functions as network management and configuration, software downloads (e.g., to the STs 234*a*-234*n*), status monitoring, statistics functions (e.g., collection, aggregation and reporting), security functions (e.g., key generation, management and distribution), ST registration and authentication, and GW diversity management. The NOC 242 communicates with each GW via the satellite 232, or via a secure private communications network 252 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 238a-238n include one or more IP gateways (IPGWs)—whereby the data plane functions are divided between a GW and its respective IPGWs. For example, GW 238a includes IPGWs 248a(1)-248a(n) and GW 238n includes IPGWs 248n(1)-248n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Accordingly, an inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 242, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 242. The STs 234a-234n provide connectivity to one or more hosts 244a-244n and/or routers 254a-254n, respectively. The Satellite communications system may operate as a bent-pipe system, where the satellite essentially operates as a repeater or bent pipe. Alternatively, the system may employ a switching or processing satellite supporting mesh communications (point-to-point communications directly between, for example, the two STs 234a and 234n).

In a bent-pipe system of an example embodiment, the satellite 232 operates as a repeater or bent pipe, and communications to and from the STs 234a-234n are transmitted over the satellite 232 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 232, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). More specifically, for a data communication from ST 234a to a public communications network 258 (e.g., the Internet), the ST 234a is associated with an IPGW (e.g., IPGW 248a(1)—selected from a pool of IPGWs available to the ST 234a, such as IPGWs 248a(1)-248a(7)—where the pool of IPGWs is a suitable subset of the IPGWs 248a(1)-248a(n) located at the GW 238a). The data is first transmitted, via the satellite 232, from the ST 234a to associated IPGW 248a(1). The IPGW 248a(1) determines the destination as being the Internet 258. The IPGW then repackages the data (e.g., as a TCP/IP communication), and routes the data communication, via the terrestrial link 264, to the Internet 258.

Figure 3C:
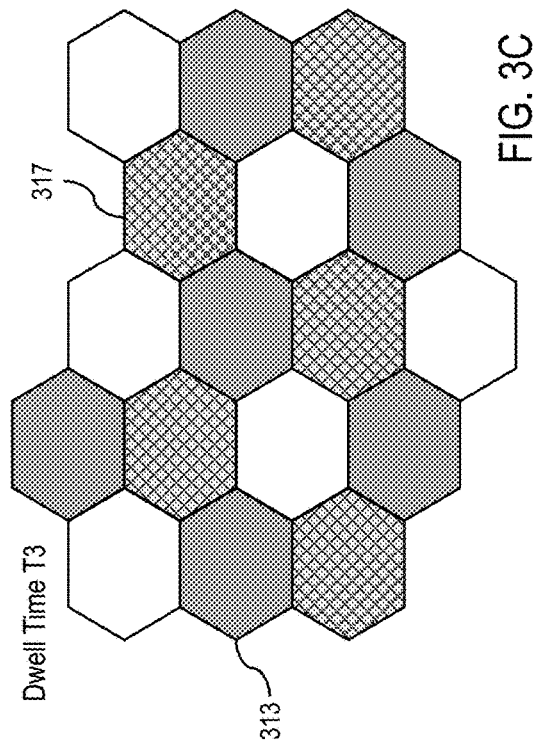
FIGS. 3A-3C illustrate a time-based three-color frequency reuse beam pattern, where
Figure 3D:
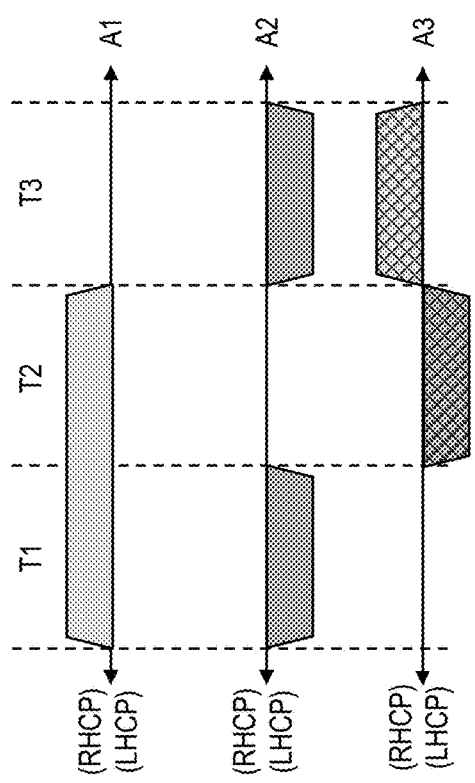
FIG. 3D illustrates time lines reflecting the three Dwell Times of the time-based three-color frequency reuse beam pattern of FIGS. 3A-3C, in accordance with example embodiments of the present invention.
Figure 3A:
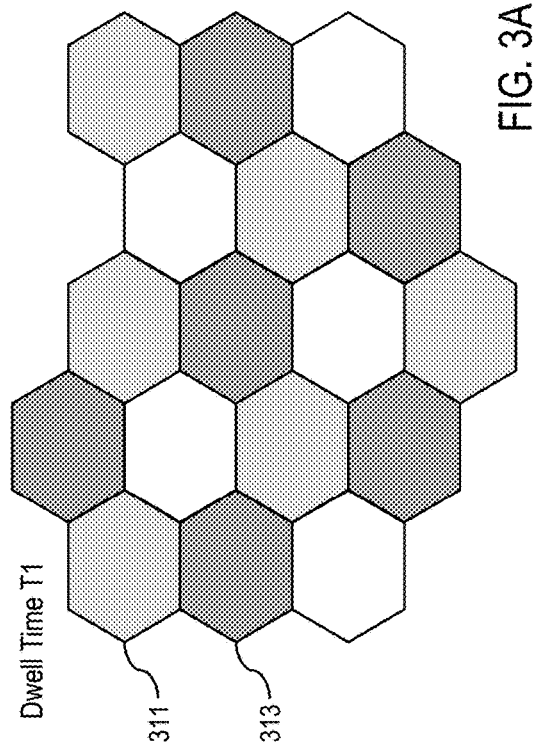
Figure 3B:
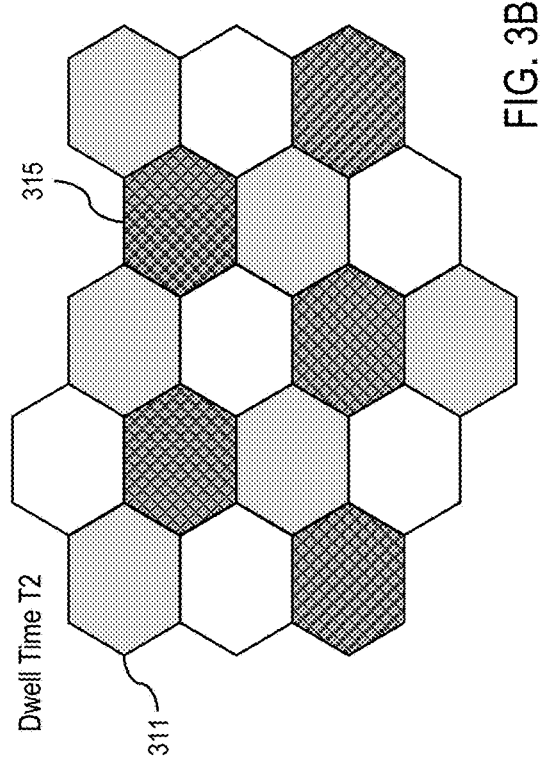

FIGS. 3A-3C illustrate a time-based three-color frequency reuse beam pattern, where FIG. 3A depicts the pattern during a first Dwell Time (T1), FIG. 3B depicts the pattern during a second Dwell Time (T2) and FIG. 3C depicts the pattern during a third Dwell Time (T3), in accordance with example embodiments of the present invention. Each hexagon represents a cell/beam in a frequency reuse system. Cells of the same shade/color (where each of the different colors is represented in the Figures as a respective shade of gray and/or patterning) represent geographic areas (on the ground) in which service is provided to user terminals using the same satellite frequency and polarization at the same time. For example, (i) the lighter shaded cells 311 (e.g., corresponding to Color-1) reflect beams of a frequency band at a first polarization (e.g., RHCP, as depicted) illuminating the respective cells during the dwell times T1 and T2, (ii) the darker shaded cells 313 (e.g., corresponding to Color-2) reflect beams of the frequency band at a second polarization (e.g., LHCP, as depicted) illuminating the respective cells during the dwell times T1 and T3, (iii) the darker shaded cross-hatched cells 315 (e.g., corresponding to Color-3A) reflect beams of the frequency band at the first polarization (e.g., RHCP, as depicted) illuminating the respective cells during only the dwell time T2, and (iv) the lighter shaded cross-hatched cells (e.g., corresponding to Color-3B) reflect beams of the frequency band at the second polarization (e.g., LHCP, as depicted) illuminating the respective cells during only the dwell time T3. The Color-3A and Color-3B together are considered as one color of the three-color reuse scheme FIG. 3D illustrates time lines reflecting the three Dwell Times of the time-based three-color frequency reuse beam pattern of FIGS. 3A-3C, in accordance with example embodiments of the present invention.

According to one example embodiment, the version of the time-based reuse system shown in FIGS. 3A-3D may be provided from three antennas. By way of example, there would be a 1:1 correspondence between the antenna and the color, where the Color-1 cells 311 are served from a first antenna (A1), the Color-2 cells are served from a second antenna (A2) and the Color-3 cells are served from a third antenna (A3). By way of further example, the Antenna A1 exclusively uses the right hand circular polarization (RHCP) and the Antenna A2 exclusively uses the left hand circular polarization (LHCP). The Antenna A3 uses both RHCP and LHCP, but not at the same time in the same cell. Whenever a cell is active, it receives the full frequency spectrum on whichever polarization is in use—in this example, each Antenna A1 beam provides the full spectrum with RHCP, each Antenna A2 beam provides the full spectrum with LHCP, and each Antenna A3 beam provides the full spectrum with RHCP during certain dwell times and with LHCP during certain other dwell times. Accordingly, on the ground, each terminal need only receive/transmit at one polarization depending on the uplink/downlink beams to which the terminal is assigned.

Further, assuming that the frequency band provides 1500 MHz of spectrum, the cells 311 and 313 receive 1500 MHz two-thirds of the time (the cells 311 at RHCP, and the cells 313 at LHCP), and the cells 315/317 also receive 1500 MHz two-thirds of the time (one-third at RHCP and one-third at LHCP). With reference to FIG. 3A, during dwell time T1 (one-third of the time), the Antenna A1 transmits 1500 MHz (at RHCP) into the Color-1 beams 311 and the Antenna A2 transmits 1500 MHz (at LHCP) into the Color-2 beams 313. The Antenna A3 is not transmitting during dwell time T1. With reference to FIG. 3B, during dwell time T2 (one-third of the time), the Antenna A1 transmits 1500 MHz (at RHCP) into the Color-1 beams 311 and the Antenna A3 transmits 1500 MHz (at LHCP) into the Color-3A beams 315. The Antenna A2 is not transmitting during dwell time T2. With reference to FIG. 3C, during dwell time T3 (one-third of the time), the Antenna A2 transmits 1500 MHz (at LHCP) into the Color-2 beams 313 and the Antenna A3 transmits 1500 MHz (at RHCP) into the Color-3B beams 317. The Antenna A1 is not transmitting during dwell time T3. Accordingly, during each dwell time, only two of the three antennae are transmitting and each is transmitting at a different polarization from the other. Over the three dwell times, the Color-1 cells receive 1500 MHz for 2 of the 3 dwell times (nominally 1000 MHz on average), the Color-2 cells receive 1500 MHz for 2 of the 3 dwell times (nominally 1000 MHz on average), and the Color-3 cells receive 1500 MHz for 2 of the 3 dwell times (nominally 1000 MHz on average). Accordingly, this approach of this example reflects a uniform three-color reuse scheme.

Figure 4A:
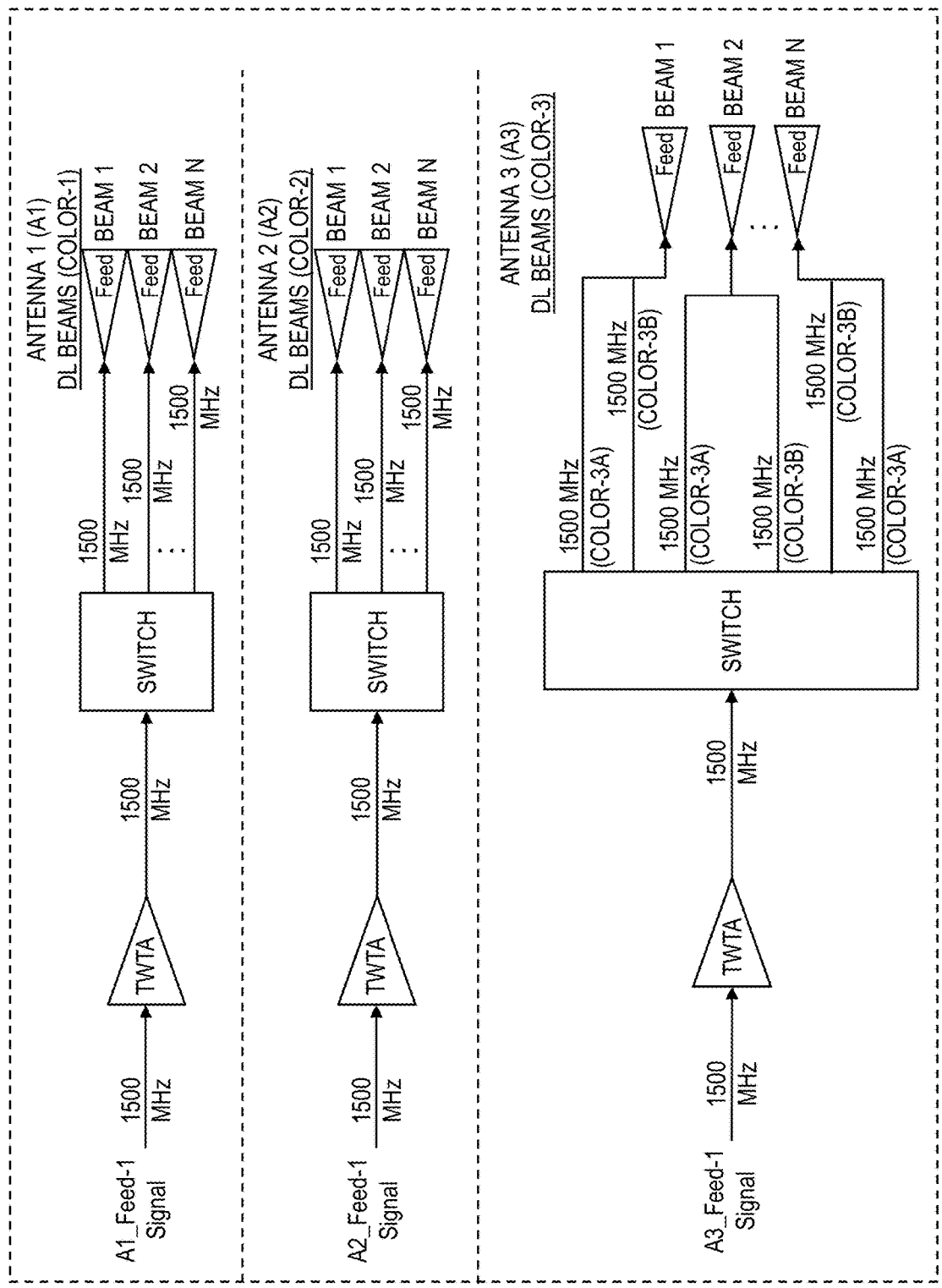
FIG. 4A illustrates an example antenna transmitter implementation for the time-based frequency reuse scheme of FIGS. 3A-3D, in accordance with example embodiments of the present invention.

FIG. 4A illustrates an example antenna transmitter implementation for the time-based frequency reuse scheme of FIGS. 3A-3D, in accordance with example embodiments of the present invention. With reference to FIG. 4A, for example, a forward or outroute direction (a gateway uplink to the satellite, which is split into multiple downlink beams for transmission to the user terminals located amongst the multiple beams). Each feed signal, which illuminates a single beam (a single feed per beam approach) connects to a TWTA and then to a switch. While the specific implementation of the waveguide connections of the feed to the TWTA and to the switch are not shown by the Figure in detail, different potential implementations would be appreciated and achievable (based on antenna design considerations) by one of skill in the art. The switch routes the full spectrum (e.g., 1500 MHz) of the feed signal to the respective polarizing feed for each individual downlink beam of the respective color for a respective dwell time. With regard to the Color-3 beams, the switch has two outputs for each beam (one output for each of the two polarizations), where each beam is being transmitted at only one of the polarizations during a respective dwell time. By way of example, the horns for each beam of the Antenna A1 and of the Antenna A2 may be single-pole horns, whereas the horns for each beam of the Antenna A3 may be dual-pole horns.

Figure 4B:
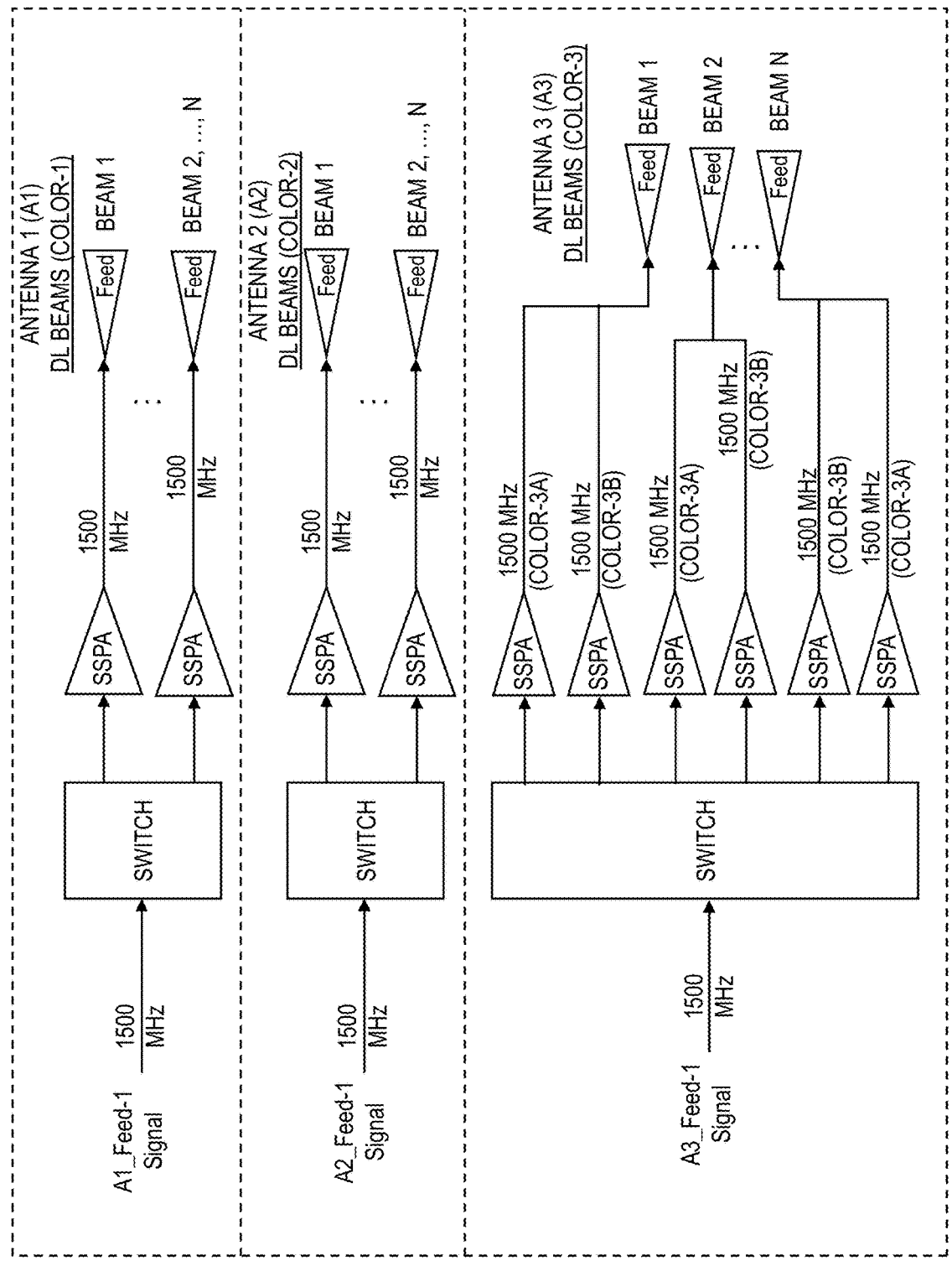
FIG. 4B illustrates an alternative example antenna transmitter implementation for the time-based frequency reuse scheme of FIGS. 3A-3D, in accordance with example embodiments of the present invention.

FIG. 4B illustrates an alternative example antenna transmitter implementation for the time-based frequency reuse scheme of FIGS. 3A-3D, in accordance with example embodiments of the present invention. With reference to FIG. 4B, the antenna implementation for this reuse scheme does not require TWTA amplifiers. Instead, it can be implemented with SSPA or other devices. The main difference is that the switch would be located before the SSPA rather than after the TWTA (as illustrated in the Figure). In FIG. 4B, the depiction of the Beams 2 thru N for the Color-1 beams and for the Color-2 beams are each shown as a single 1500 MHz SSPA feed for simplicity and to fit them in the figure—however, as would be appreciated (in practice) each individual Color-1 and Color-2 beam would be implemented as a separate SSPA per-feed (as shown for the Color-3 beams of FIG. 4B).

Further, in accordance with the time-based three-color reuse example described above with reference to FIGS. 3A-3D, the various dwell times of the respective beams may be configured in any manner to adjust the capacity distribution amongst the beams. For example, the Antenna A1 Beam 1 may be active two-thirds of the time (e.g., illuminating the cell labeled 311)—this leaves the A1_Feed-1 signal spectrum free for one-third of the time to serve other beams illuminated from the Antenna A1 (depicted as the Antenna A1 (Color-1) Beams 2 thru N in FIGS. 4A and 4B), which may share the remaining one-third time in any desired manner subject to the distance/interference constraints of such a three-color reuse scheme. Similarly, the Antenna A2 Beam 1 may be active two-thirds of the time (e.g., illuminating the cell labeled 313)—this leaves the A2_Feed-1 signal spectrum free for one-third of the time to serve other beams illuminated from the Antenna A2 (depicted as the Antenna A2 (Color-2) Beams 2 thru N in FIGS. 4A and 4B), which also may share the remaining one-third time in any desired manner subject to the distance/interference constraints of such a three-color reuse scheme. The Antenna A3 Beam 1 may be active one-third of the time for transmission at a first polarization (e.g., the Color-3B RHCP beam illuminating the cell labeled 317) and one-third of the time for transmission at a second polarization (e.g., the Color-3A LHCP beam illuminating the cell labeled 315)—this leaves the A3_Feed-1 signal TWTA free for one-third of the time to serve other beams illuminated from the Antenna A3 (depicted as the Antenna A3 Beams 2 thru N in FIGS. 4A, 4B), which may share the remaining one-third time in any desired manner subject to the distance/interference constraints of such a three-color reuse scheme. Further, as would be recognized, the various dwell times or percentages shown in FIG. 4A may be altered in any manner to change the capacity distribution amongst the beams.

FIG. 5 illustrates the beam/cell pattern of the time-based frequency reuse scheme depicted in FIGS. 3A-3D overlaid on a map of the Northeastern United States, in accordance with example embodiments of the present invention. By way of example, the Antenna A1 Beam 1 may be directed at the cell 501 covering northern New Jersey, New York City and eastern Long Island (e.g., Brooklyn), the Antenna A2 Beam 1 may be directed at the cell 503 covering eastern Long Island, Conn. and western Rhode Island, and the Antenna A3 Beam 1 may be directed at the cell 505 covering eastern Massachusetts (including Boston and the Cape). With this configuration (as shown in FIGS. 3A-3D and 4A-4B, and the example of 1500 MHz per beam), the major metropolitan areas of high population density (e.g., northern Jersey, New York City, western Long Island, Boston, etc.) within the cells 501, 503, 505 would be covered by the full 1500 MHz of spectrum of the feed signals A1_Feed-1, A2_Feed-1 and A3_Feed-1, respectively, for a total dwell time for each cell of two-thirds of the time that the respective antenna is transmitting (e.g., effectively $\frac{2}{3} \times 1500 = 1000$ MHz). Additionally, the 1500 MHz of each of the three feed signals A1_Feed-1, A2_Feed-1 and A3_Feed-1 for the remaining one-third of dwell time can be respectively shared by a number of additional beams, provided that the transmit feed for each such beam is connected to the same switch as the respective feed, and that applicable frequency reuse constraints are not violated. For example, the Antenna A1 Beams 2 and 3 may be directed at the cells 507 and 509, respectively, each for a dwell time of one-sixth of the time that the Antenna A1 is transmitting (e.g., effectively $\frac{1}{6} \times 1500 = 250$ MHz to each cell). Similarly, the Antenna A2 Beams 2 and 3 may be directed at the cells 511 and 513, respectively, each for a dwell time of one-sixth of the time that the Antenna A2 is transmitting (e.g., effectively $\frac{1}{6} \times 1500 = 250$ MHz to each cell). Also, the Antenna A3 Beams 2 and 3 may be directed at the cells 515 and 517, respectively, each for a dwell time of one-sixth of the time that the Antenna A3 is transmitting (e.g., effectively $\frac{1}{6} \times 1500 = 250$ MHz to each cell). Alternatively, the Antenna A3 Beams 2 and 3 may be directed at the cells 515, 517, 519, 521, respectively, each for a dwell time of one-twelfth of the time that the Antenna A3 is transmitting (e.g., effectively $\frac{1}{12} \times 1500 = 125$ MHz to each cell). By way of example, the diameter of a cell/beam may be on the order of 110-200 km.

In accordance with such example embodiments, the capacity can thus be flexibly allocated across the cell pattern of the satellite antennae. Further, the allocation may be preprogrammed via a dwell time plan for each feed of each antenna. Additionally, the capacity allocations can be dynamically updated to address various circumstances, such as weather changes that may trigger a need to adjust capacity allocations of affected cells, changes in system loading over time (e.g., based on changes in subscriber numbers and associated user population densities across the geographical area of the subscriber base, antenna element failures, etc. Also, traffic demand may also change due to mobility (e.g., traffic for aircraft or other mobile internet services). Accordingly, such time-based frequency reuse and capacity allocation permits the varying of the capacity allocations continually while the satellite is in operation (on orbit)—the time-based capacity plan can be dynamically programmed and modified over time. Further, the flexibility facilitated by embodiments of the present invention is achieved in a simple manner, for example, by employing analog switches to switch the feed amongst the different beam outputs based on a beam allocation time plan.

By contrast, with a traditional filter architecture, dynamic adaptation of capacity allocation in such a manner would require dynamic adaptation of the bandwidth passed through a filter for a particular beam. Such filter adaptation is impossible with individual fixed analog filtering circuits, and would thus require multiple filter circuits of different bandwidths and a switching component to switch between the filters depending on the desired bandwidth for a beam. Such an approach would significantly increase the complexity and hardware requirements of the circuitry for each beam—and multiplied by, for example, 100 beams would significantly increase the complexity, cost, size and weight of the satellite payload (likely beyond reasonable or even absolute limits). An alternative approach would be to employ digital signal processing for the filtering of the feed for each beam, which would similarly impose significant adverse impacts on the complexity, cost, etc. of the antenna. Programmable digital filters are consistent with state of the art, however their mass and power requirement far exceed that of the simple switches proposed herein.

In further accordance with such example embodiments, as would be recognized, while the embodiments of the Figures show antenna configurations with one uplink feed and switch per antenna, in practice, each antenna would support a number of uplink or input feeds and a number of switches, with each switch feeding a respective number of downlink beams. Further, the number of input feeds of a given antenna, for example, in the case of the forward link, may depend on the number of gateway locations or feederlink beams that the antenna is required to service. Similarly, the number of downlink feeds of a given antenna, for example, again in the case of the forward link, may depend on the required coverage area of the antenna, the bandwidth of each beam feed and the number of downlink cells desired to cover the area. As would be further appreciated, the number of input and output feeds of each switch may depend on such factors as the switch technology, the ultimate layout of the downlink beams of the respective antenna and the frequency reuse configuration of the beams, and the resulting geometry and layout of the antenna components (e.g., required waveguides for the switch connections may be restricted by antenna space constraints). Further, the system thereby provides for virtually unlimited flexibility, limited only by design constraints arising from the implementation of the satellite and antenna—e.g., size, weight and power constraints of the overall satellite implementation, and physical constraints arising from the antenna technology (e.g., the switch technology, the waveguide technology and the overall layout of the antenna). The input feed, switch and output beam configurations (e.g., the number of input feeds and output beams of a switch) can be laid out to facilitate a tremendous amount of flexibility in the allocation of capacity amongst a wide dispersal of the beams. Further, the limit on the flexibility is based on the specific feeds attached to each switch. Within that group, the downlink time and data rate for each beam is flexible but cannot exceed the total spectrum. So, the fixed assignment of a set of beams to a switch is a limitation. By way of further example, however, an additional layer of switching could add further flexibility—in other words switches could be interconnected.

As would be further understood, the number of desired beams, the width of the beams, and the desired beam pattern (e.g., covering the continental United States) would be limited in part by the antenna size (the feed horn cluster size and the related reflector size). With regard to the three antennae time-based three-color reuse example (described above), for example, each antenna may illuminate its respective pattern of one-third of the cells of an overall cell pattern covering the United States (based on the cells that each antenna illuminates). Considering the focal point of each feed and the principles of geometrical optics, the location of a particular beam on the Earth's surface, from a respective feed horn, depends on the location of the horn within the feed cluster of the antenna—the physical position of the feed relative to the antenna reflector determines the location of the resulting beam on the surface of the Earth. Accordingly, the beam spacing on the surface of the Earth depends on the spacing of the horns in the feed cluster, where the spacing will generally be constrained by certain factors, including the size of the feed horn, the available space of the feed cluster, the number of desired beams and the pattern of the overall coverage area. Also, the larger the antenna (reflector), the smaller the beam. A larger feed horn, on the other hand, illuminates a smaller part of the antenna than a small feed would. So the antenna "looks smaller" and produces a larger beam. In other words, larger feed, larger beam. Conversely, making a feed really small will illuminate "more" than the entire antenna (reflector) resulting in "spillover" or "over-illumination." Basically, a lot of the energy from the feed goes "past" the antenna and doesn't radiate towards Earth. Moreover, the antenna design must also factor in the polarizer and waveguide inputs at the back of the feed horns, which also consume real estate in the physical antenna implementation. Therefore, the number of beam and the beam size, and the desired pattern (e.g., three-color reuse) and overall coverage area on the surface of the Earth, will drive the antenna size for each antenna, and thus will also be constrained by physical limits on the antenna size. Further, the beam design requirements will thus also determine/drive the number of antennae of the satellite design (more antennae can be used to achieve an increased number of narrower beams)—and will similarly be limited by the satellite size, weight and power constraints.

Accordingly, example embodiments of the present invention facilitate flexible capacity allocation, whereby capacity density is dynamically adaptable in time across the different ground-based cells of the system coverage area, without sacrificing capacity in adjacent beams and without adverse impact with regard to satellite size, weight, power and complexity constraints. For example, such approaches avoid the partitioning of the frequencies of a particular polarization, thus eliminating filter requirements and reducing the satellite antenna hardware complexity. With a typical single feed per beam satellite antenna architecture. In order to divide the spectrum of a feed and allocate portions of the spectrum across different beams (especially in the case where the partitioning is not evenly allocated across the beams), complex filtering is required.

Figure 6:
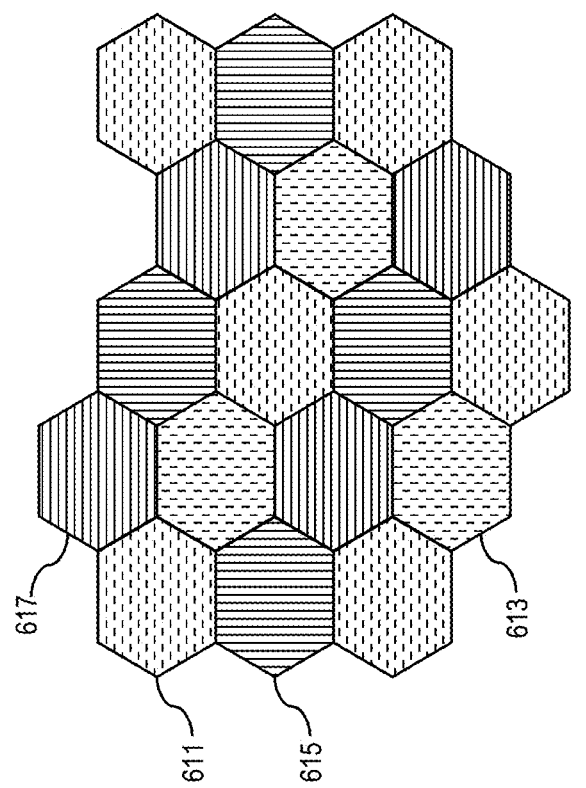
FIG. 6 illustrates the cell structure of a satellite employing four antennas, in accordance with example embodiments of the present invention.

FIG. 6 illustrates the cell structure of a satellite employing four antennas, in accordance with example embodiments of the present invention. The Figure shows an example cell structure achieved using four antennas, where each pattern illustrated in FIG. 6 represents the cells served by a respective one of the four antennae. The horizontal dash pattern 611 represents the cells served by the first antenna, the vertical dash pattern 613 represents the cells served by the second antenna, the vertical line pattern 615 represents the cells served by the third antenna, and the horizontal line pattern 617 represents the cells served by the fourth antenna.

Figure 7A:
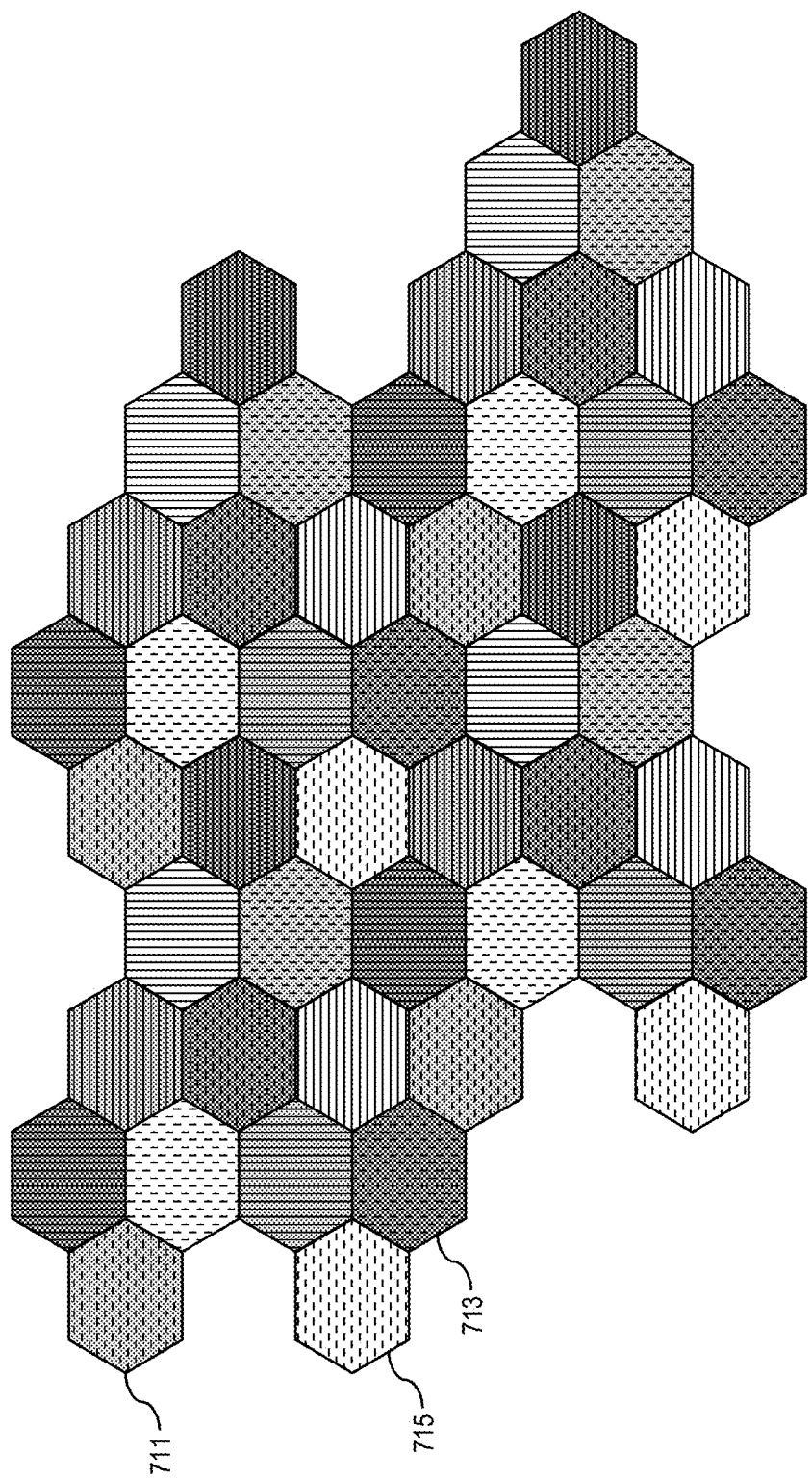
FIG. 7A illustrates a three-color reuse pattern imposed on the four antenna pattern of FIG. 5, in accordance with example embodiments of the present invention.

FIG. 7A illustrates a three-color reuse pattern imposed on the four antenna pattern of FIG. 5, in accordance with example embodiments of the present invention. The three colors are represented by the light gray shade (Color-1) 711, the dark gray shade (Color-2) 713 and no gray shade (Color-3) 715, and the four antennae are again represented by the four different line patterns, respectively. Note that each color appears on each antenna.

Figure 7B:
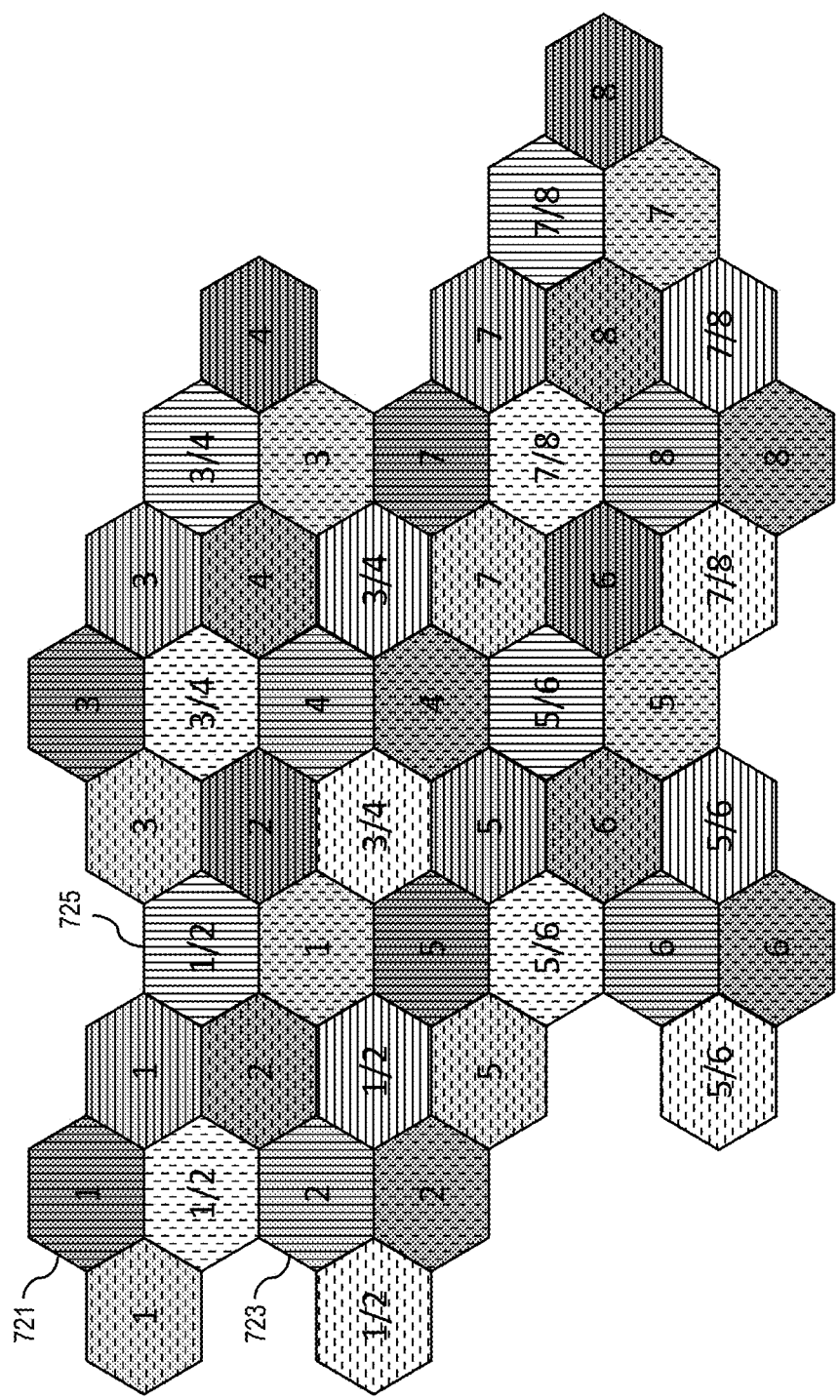
FIG. 7B illustrates an example amplifier assignment configuration for the three-color reuse pattern of FIG. 7A, in accordance with example embodiments of the present invention.

FIG. 7B illustrates an example amplifier assignment configuration for the three-color reuse pattern of FIG. 7A, in accordance with example embodiments of the present invention. By way of example, the darker shaded cell with the vertical stripes (cell 721) may use amplifier 1 to provide the Color-2 frequency/polarization during two-thirds of the time. The lighter shaded cell with the vertical stripes (cell 723) may use amplifier 2 to provide the Color-1 frequency/ polarization during two-thirds of the time. This does not cause interference because they are using opposite polarizations. During the remaining one-third of the time, the cell 725 may use a combination of amplifiers 1 and 2 to provide the Color-3 frequency/polarization. By way of further example, the cell 725 may be generated by a dual pole feed adjacent to both amplifiers 1 and 2, which minimizes the waveguide run lengths and does not require additional switches (since it is a dual pole feed). The remaining cells of FIG. 7B may be generated in similar manners with the illustrated amplifier assignments.

Figure 8:
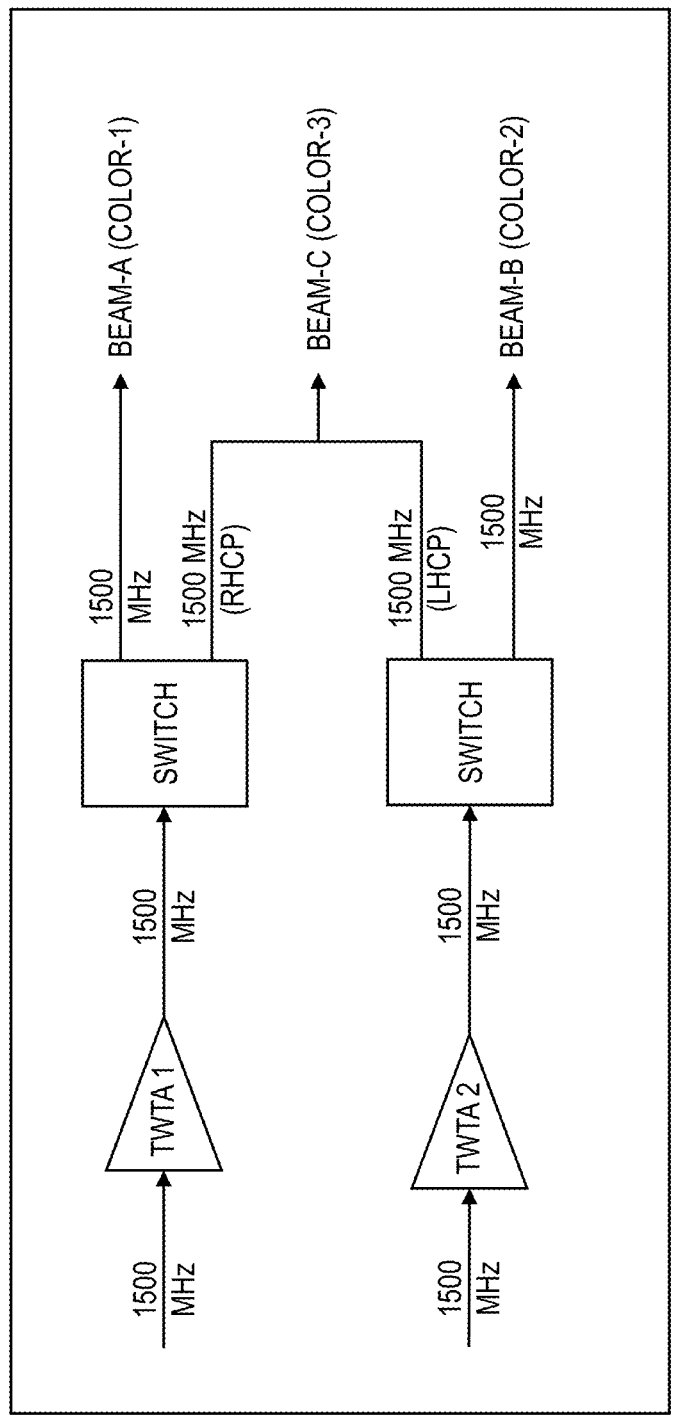
FIG. 8 illustrates an example satellite transmitter implementation for the three-color reuse scheme of FIG. 7B, in accordance with example embodiments of the present invention.

FIG. 8 illustrates an example satellite transmitter implementation for the three-color reuse scheme of FIG. 7B, in accordance with example embodiments of the present invention. With this approach, for example, the amplifier TWTA 1 may service the Color-1/Beam-A two-thirds of the time, the amplifier TWTA 2 may service the Color-2/Beam-B two-thirds of the time, and the dual feed of the TWTA 1 and TWTA 2 may together service the Color-3/Beam-C one-third of the time (where the TWTA 1 services the beam via RHCP and the TWTA 2 services the beam via LHCP).

Figure 9A:
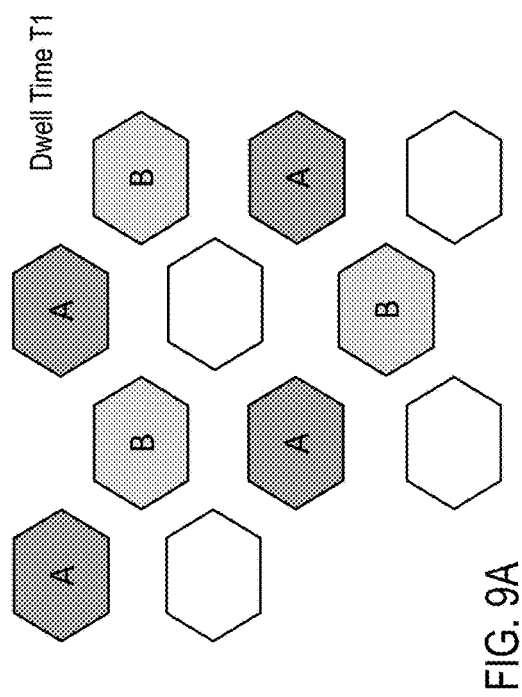
FIGS. 9A-9C illustrate diagrams depicting amplifier dwell timing for the three-color reuse scheme of FIG. 7B, where
Figure 9B:
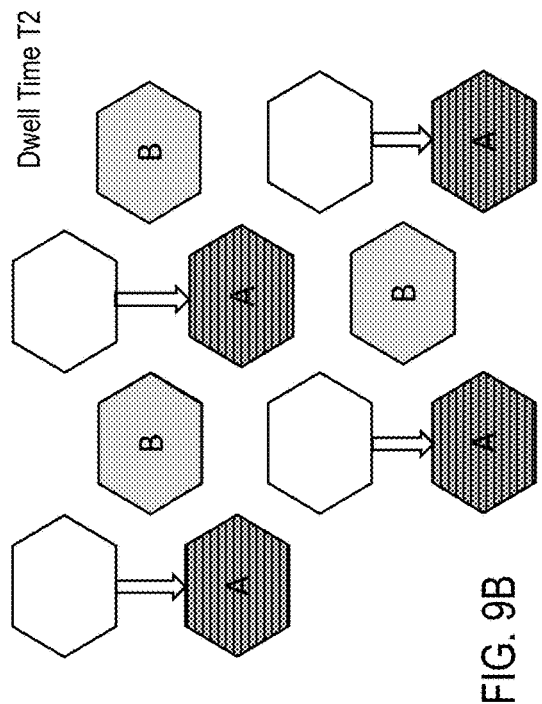
Figure 9C:
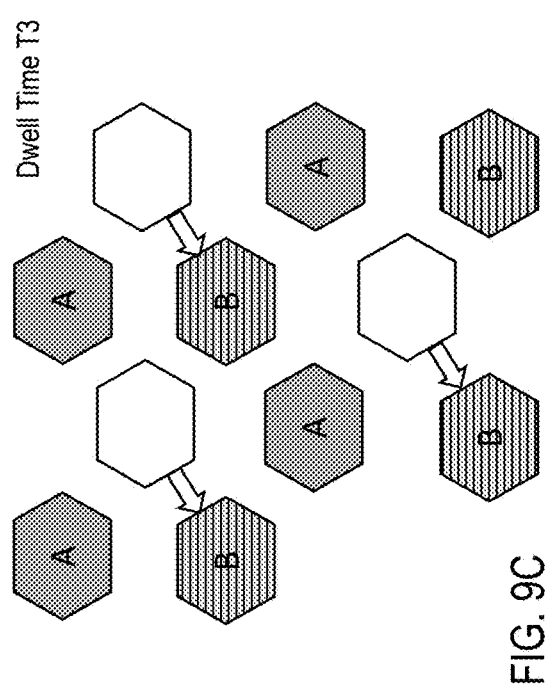

FIGS. 9A-9C illustrate diagrams depicting amplifier dwell timing for the three-color reuse scheme of FIG. 7B, where FIG. 9A depicts the pattern during a first Dwell Time (T1), FIG. 9B depicts the pattern during a second Dwell Time (T2) and FIG. 9C depicts the pattern during a third Dwell Time (T3), in accordance with example embodiments of the present invention. The illustrated amplifier timing reflects the operation of just one antenna. The other three antennas operate in the same manner, but offset in space. Each figure shows how amplifiers "A" and amplifiers "B" are switched from one dwell time to the next for the three dwell times.

Figure 9D:
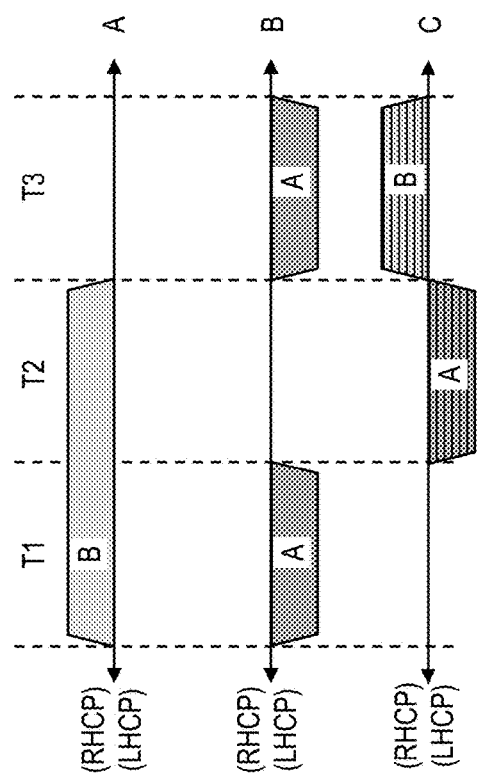
FIG. 9D illustrates time lines reflecting the three Dwell Times of the time-based three-color frequency reuse beam pattern of FIGS. 9A-9C, in accordance with example embodiments of the present invention.

FIG. 9D illustrates time lines reflecting the three Dwell Times of the time-based three-color frequency reuse beam pattern of FIGS. 9A-9C, in accordance with example embodiments of the present invention. As with the example embodiment of FIGS. 3A-3D, the A and B cells each receive the full spectrum (e.g., 1500 MHz) two-thirds of the time, and the A/B horizontal-lined cells A/B also receive the full spectrum (e.g., 1500 MHz) two-thirds of the time.

The four antenna time-based three-color reuse approach of FIGS. 6-9 thereby achieves even further enhanced flexibility in the capacity allocation amongst the beams. This enhanced flexibility arise from the ability to switch a particular TWTA from a one of the three color beams (at the respective frequency/polarization pair) to a different one of the three color beams (at the different respective frequency/polarization pair) transmitted from the same antenna (from the same feed array). Whereas, with the three antenna approach (described above with reference to FIGS. 3-5), because each of the three antennae serviced only one color of the three-color reuse scheme, switching a given TWTA from a beam of one color to a beam of a different color would require switching the TWTA from one antenna (servicing the beams of the first color) to a different antenna (servicing the beams of the other color). Switching a given TWTA between different antennae—however, based on antenna/satellite design constraints, would be extremely difficult and inefficient (if not impossible) to facilitate. A beam of a desired Equivalent Isotropic Radiated Power (EIRP) requires a respective TWTA amplification level (which depends in part on the power loss due to the waveguide run between the TWTA and the beam horn), and thus the waveguide run from the TWTA to the horn should be minimized in order to minimize power loss. Accordingly, for a given antenna, the TWTAs are ideally located in positions to minimize the waveguide runs to the respective switches serving the beams of that antenna that the TWTAs will drive, and providing for the ability to switch a particular TWTA to a horn of a different antenna would require too long of a waveguide run to effectively preserve enough power to transmit the respective beam at the desired EIRP (also, such waveguide runs would likely also add too much complexity, size, space and weight to the overall antennae implementations).

Moreover, an additional benefit of transmitting 1500 MHz at all times to the active beam is to overcome interference occurring in a shared band. For example, the 17.8-18.3 GHz band is shared between terrestrial microwave and the satellite downlink. If a particular satellite receiver experiences significant interference from a nearby microwave tower, that receive can use a carrier in a different portion of the downlink band. Similarly, if the Ka-band downlink frequency allocation differs between countries, the satellite transmitter can enable or disable a portion of the band accordingly without violating any reuse constraints.

Further, the time-based approach does not necessarily imply that the spectrum being transmitted from a single amplifier remain constant. For example, a TWTA may serve some beams that can use 2000 MHz and other beams that can use 1500 MHz. This change would be accomplished by turning carriers on and off at the terrestrial transmitter without needing to make any changes on the satellite.

This technique could also be used in a hybrid configuration in which some beams were time-based and some beams were fixed. The fixed reuse pattern would have less than 1500 MHz per beam but on all the time. This would create frequency reuse conflicts that need to be resolved in some fashion. One technique would be to change the bandwidth used during time periods for beams in the transition region between fixed and time-based reuse.

Figure 10:
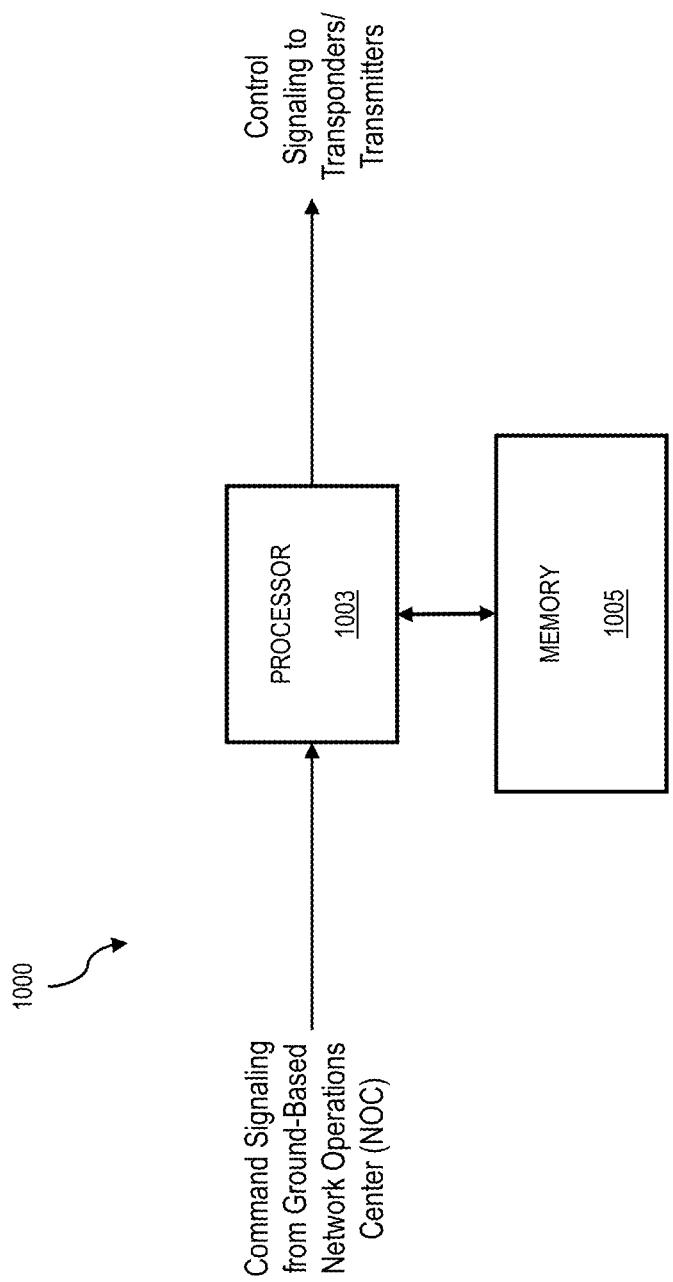
FIG. 10 illustrates an example processor control system for controlling the operation and transmission of a time-based frequency reuse beam approach, in accordance with example embodiments of the present invention.

FIG. 10 illustrates an example processor control system 1000 for controlling the operation and transmission of a time-based frequency reuse beam approach, in accordance with example embodiments of the present invention. The processor control system includes, for instance, a processor 1003 and memory 1005 incorporated in one or more physical devices. By way of example, as specified above, such processor-implemented control circuitry may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store. By way of further example, the memory may comprise any medium that participates in providing instructions to the processor which may take many forms, including but not limited to non-transitory non-volatile media and volatile media. Non-volatile media include, for example, optical storage media, magnetic storage media or electrical storage media (e.g., solid state storage media). Volatile media include dynamic memory, such random access memory or RAM, and non-volatile memory include memory such as programmable read only memory (PROM), erasable PROM, flash EPROM, any other memory chip or cartridge, or any other such medium from which a processor can read data.

According to example embodiments, the memory may store program instructions and operational and control data for controlling the satellite transmitters to process the feed signals and transmit the beams of a time-based frequency reuse approach of such example embodiments. In that regard, the processor may execute control programs and provide resulting control signaling to the satellite transmitters for controlling the transmitters to process the feed signals and transmit the beams of a particular time-based frequency reuse approach. Further, the processor may further be controlled from a ground-based NOC (e.g., the NOC 242 of FIG. 2). In that regard, the NOC may provide command signaling for initial configuration and programming of particular time-based frequency reuse approaches to be implemented by the satellite payload. Further, the NOC may also provide command signaling for dynamic control and reconfiguration of the particular time-based frequency reuse approaches to be implemented by the satellite payload.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A radio frequency (RF) communications transmitter system comprising:
   at least one control processor;
   a plurality of switches; and
   a plurality of feedhorns associated with each switch; and
   wherein each switch is configured to receive a feed signal of a respective frequency bandwidth and, for each of the plurality of feedhorns associated with the switch, to output a transmission signal of the respective frequency bandwidth and of a respective polarization;
   wherein the at least one control processor is configured to control each switch to output the transmission signals for the plurality of feedhorns associated with the switch during each of a number of respective dwell times;
   wherein each of the plurality of feedhorns associated with a respective switch is configured to form and transmit a communications beam during each respective dwell time that the switch is outputting the transmission signal for the feedhorn, wherein each beam is formed based on the respective transmission signal and is transmitted to cover a respective geographic area on the surface of the Earth, and the beams of the plurality of feedhorns associated with each switch are configured to form a respective pattern of beams on the surface of the Earth, each beam being of the frequency bandwidth and the respective polarization; and
   wherein the at least one control processor is configured to control the number of dwell times during which each of the plurality of switches outputs the respective transmission signals, for the formation and transmission of the respective beam pattern by the associated feedhorns, to switch between different combinations of beam pattern transmissions over time in accordance with frequency/polarization reuse scheme based on the number of dwell times.

2. The RF communications transmitter system according to claim 1, wherein the frequency/polarization reuse scheme is a three color reuse plan, wherein the transmission signal of the respective frequency bandwidth and polarization output by each switch for the respective feedhorns associated with the switch reflects a respective one of the three colors.

3. The RF communications transmitter system according to claim 2, wherein:
the transmission signal for each feedhorn associated with a first of the plurality of switches is of the respective frequency bandwidth and a first polarization and is output for a first and a second of the dwell times, and the communications beam formed and transmitted by each of the respective feedhorns reflects a first of the three colors and is formed and transmitted for the first and second dwell times;
the transmission signal for each feedhorn associated with a second of the plurality of switches is of the respective frequency bandwidth and a second polarization and is output for the first and a third of the dwell times, and the communications beam formed and transmitted by each of the respective feedhorns reflects a second of the three colors and is formed and transmitted for the first and third dwell times;
a first subset of the transmission signals for the feedhorns associated with a third of the plurality of switches is of the respective frequency bandwidth and the first polarization and each such transmission signal is output for the third dwell time, and the communications beam formed and transmitted by each of the respective feedhorns reflects a third of the three colors and is formed and transmitted for the third dwell time; and
a second subset of the transmission signals for the feedhorns associated with the third of the plurality of switches is of the respective frequency bandwidth and the second polarization and each such transmission signal is output for the second dwell time, and the communications beam formed and transmitted by each of the respective feedhorns reflects the third of the three colors and is formed and transmitted for the second dwell time.

4. The RF communications transmitter system according to claim 2, further comprising:
a plurality of antennae, wherein each antenna includes the feedhorns that are configured to form and transmit respective beams based on the transmission signals of the respective frequency bandwidth and polarization that reflect a same respective one of the three colors.

5. The RF communications transmitter system according to claim 1, further comprising:
a plurality of antennae, wherein each antenna includes the feedhorns that are configured to form and transmit the communications beams of a respective frequency/polarization pair of the frequency/polarization reuse scheme.

6. A radio frequency (RF) communications transmission method comprising:
receiving, by each of a plurality of switches of an RF communications transmitter system, a feed signal of a respective frequency bandwidth and outputting, by each switch, a transmission signal of the respective frequency bandwidth and of a respective polarization for each of a plurality of feedhorns associated with the switch;
controlling each switch, by at least one processor, to output the transmission signals for a plurality of feedhorns associated with the switch during each of a number of respective dwell times;
forming and transmitting, by each of the plurality of feedhorns associated with a respective switch, a communications beam during each respective dwell time that the switch is outputting the transmission signal for the feedhorn, wherein each beam is formed based on the respective transmission signal and is transmitted to cover a respective geographic area on the surface of the Earth, and the beams of the plurality of feedhorns associated with each switch are configured to form a respective pattern of beams on the surface of the Earth, each beam being of the frequency bandwidth and the respective polarization; and
controlling, by the at least one processor, the number of dwell times during which each of the plurality of switches outputs the respective transmission signals, for the formation and transmission of the respective beam pattern by the associated feedhorns, to switch between different combinations of beam pattern transmissions over time in accordance with a respective frequency/polarization reuse scheme based on the number of dwell times.

7. The RF communications transmission method according to claim 6, wherein the frequency/polarization reuse scheme is a three color reuse plan, wherein the transmission signal of the respective frequency bandwidth and polarization output by each switch for the respective feedhorns associated with the switch reflects a respective one of the three colors.

8. The RF communications transmission method according to claim 7, wherein:
the transmission signal for each feedhorn associated with a first of the plurality of switches is of the respective frequency bandwidth and a first polarization and is output for a first and a second of the dwell times, and the communications beam formed and transmitted by each of the respective feedhorns reflects a first of the three colors and is formed and transmitted for the first and second dwell times;
the transmission signal for each feedhorn associated with a second of the plurality of switches is of the respective frequency bandwidth and a second polarization and is output for the first and a third of the dwell times, and the communications beam formed and transmitted by each of the respective feedhorns reflects a second of the three colors and is formed and transmitted for the first and third dwell times;
a first subset of the transmission signals for the feedhorns associated with a third of the plurality of switches is of the respective frequency bandwidth and the first polarization and each such transmission signal is output for the third dwell time, and the communications beam formed and transmitted by each of the respective feedhorns reflects a third of the three colors and is formed and transmitted for the third dwell time; and
a second subset of the transmission signals for the feedhorns associated with the third of the plurality of switches is of the respective frequency bandwidth and the second polarization and each such transmission signal is output for the second dwell time, and the communications beam formed and transmitted by each of the respective feedhorns reflects the third of the three colors and is formed and transmitted for the second dwell time.

9. A radio frequency (RF) communications satellite transmission system comprising:
    at least one control processor;
    a plurality of switches;
    a plurality of feedhorns associated with each switch; and
    a plurality of antennae; and
    wherein each switch is configured to receive a feed signal of a respective frequency bandwidth and, for each of the plurality of feedhorns associated with the switch, to output a transmission signal of the respective frequency bandwidth and of a respective polarization;
    wherein the at least one control processor is configured to control each switch to output the transmission signals for the plurality of feedhorns associated with the switch during each of a number of respective dwell times;
    wherein each of the plurality of feedhorns associated with a respective switch is configured to form and transmit a communications beam during each respective dwell time that the switch is outputting the transmission signal for the feedhorn, wherein each beam is formed based on the respective transmission signal and is transmitted to cover a respective geographic area on the surface of the Earth, and the beams of the plurality of feedhorns associated with each switch are configured to form a respective pattern of beams on the surface of the Earth, each beam being of the frequency bandwidth and the respective polarization;
    wherein the at least one control processor is configured to control the number of dwell times during which each of the plurality of switches outputs the respective transmission signals, for the formation and transmission of the respective beam pattern by the associated feedhorns, to switch between different combinations of beam pattern transmissions over time in accordance with frequency/polarization reuse scheme based on the number of dwell times; and
    wherein each antenna includes the feedhorns that are configured to form and transmit the communications beams of a respective frequency/polarization pair of the frequency/polarization reuse scheme.

10. The RF communications satellite transmission system according to claim 9, wherein the frequency/polarization reuse scheme is a three color reuse plan, wherein the transmission signal of the respective frequency bandwidth and polarization output by each switch for the respective feedhorns associated with the switch reflects a respective one of the three colors.

11. The RF communications satellite transmission system according to claim 10, wherein:
    the transmission signal for each feedhorn associated with a first of the plurality of switches is of the respective frequency bandwidth and a first polarization and is output for a first and a second of the dwell times, and the communications beam formed and transmitted by each of the respective feedhorns reflects a first of the three colors and is formed and transmitted for the first and second dwell times;
    the transmission signal for each feedhorn associated with a second of the plurality of switches is of the respective frequency bandwidth and a second polarization and is output for the first and a third of the dwell times, and the communications beam formed and transmitted by each of the respective feedhorns reflects a second of the three colors and is formed and transmitted for the first and third dwell times;
    a first subset of the transmission signals for the feedhorns associated with a third of the plurality of switches is of the respective frequency bandwidth and the first polarization and each such transmission signal is output for the third dwell time, and the communications beam formed and transmitted by each of the respective feedhorns reflects a third of the three colors and is formed and transmitted for the third dwell time; and
    a second subset of the transmission signals for the feedhorns associated with the third of the plurality of switches is of the respective frequency bandwidth and the second polarization and each such transmission signal is output for the second dwell time, and the communications beam formed and transmitted by each of the respective feedhorns reflects the third of the three colors and is formed and transmitted for the second dwell time.

12. The RF communications transmitter system according to claim 10, wherein each antenna includes the feedhorns that are configured to form and transmit respective beams based on the transmission signals of the respective frequency bandwidth and polarization that reflect a same respective one of the three colors.

* * * * *